United States Patent
Huang et al.

(10) Patent No.: US 9,882,904 B2
(45) Date of Patent: *Jan. 30, 2018

(54) SYSTEM AND METHOD FOR FILTERING NETWORK TRAFFIC

(71) Applicant: Cisco Technology, Inc., San Jose, CA (US)

(72) Inventors: Dehua Huang, Fremont, CA (US); Adam J. Sweeney, Sunnyvale, CA (US); Pradeep S. Sudame, Fremont, CA (US); Silviu Dobrota, San Jose, CA (US); Premkumar Jonnala, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 157 days.

This patent is subject to a terminal disclaimer.

(21) Appl. No.: 14/296,087

(22) Filed: Jun. 4, 2014

(65) Prior Publication Data

US 2014/0289800 A1   Sep. 25, 2014

Related U.S. Application Data

(63) Continuation of application No. 10/971,523, filed on Oct. 22, 2004, now Pat. No. 8,788,823, which is a
(Continued)

(51) Int. Cl.
H04L 29/06   (2006.01)
(52) U.S. Cl.
CPC .......... H04L 63/10 (2013.01); H04L 63/0263 (2013.01)

(58) Field of Classification Search
USPC .............................................. 726/3
See application file for complete search history.

(56) References Cited

U.S. PATENT DOCUMENTS

| | | | |
|---|---|---|---|
| 5,550,984 A | | 8/1996 | Gelb .............................. 709/245 |
| 5,884,024 A | * | 3/1999 | Lim ................... H04L 29/12216 710/200 |

(Continued)

OTHER PUBLICATIONS

Configuring Unicast Reverse Path Forwarding; Aug. 21, 2003; 16 pages; http://www.cisco.com/univercd/cc/td/doc/product/software/ios122/122cgcr/fsecur_e/fothersf/scfrpf/htm.*

(Continued)

*Primary Examiner* — Harris C Wang
(74) *Attorney, Agent, or Firm* — Campbell Stephenson LLP

(57) ABSTRACT

Protocol status information is used to perform traffic filtering by dropping messages that are not consistent with the protocol status information. In one embodiment, a method involves comparing message information and protocol status information. The message information is associated with a first message. The protocol status information is obtained in response to one or more second messages, which are conveyed according to a protocol used to assign network addresses to clients. The method also involves determining whether to discard the first message, based on an outcome of the comparison of the message information and the protocol status information. For example, it can be determined that the first message should be discarded, if the message information does not match the protocol status information.

24 Claims, 14 Drawing Sheets

Related U.S. Application Data continuation-in-part of application No. 10/654,388, filed on Sep. 3, 2003, now Pat. No. 7,343,485.

(56) References Cited

U.S. PATENT DOCUMENTS

| | | | | |
|---|---|---|---|---|
| 6,070,187 | A * | 5/2000 | Subramaniam | H04L 29/12216 709/220 |
| 6,108,786 | A | 8/2000 | Knowlson | 726/11 |
| 6,453,360 | B1 * | 9/2002 | Muller | H04L 29/06 370/235 |
| H002051 | H * | 11/2002 | Zhu | 370/395.21 |
| 6,587,463 | B1 * | 7/2003 | Hebb | H04L 47/10 370/392 |
| 6,658,480 | B2 * | 12/2003 | Boucher | G06F 5/10 709/230 |
| 7,134,012 | B2 | 11/2006 | Doyle et al. | 713/151 |
| 7,379,423 | B1 | 5/2008 | Caves et al. | 370/232 |
| 7,516,487 | B1 * | 4/2009 | Szeto et al. | 726/22 |
| 2002/0013844 | A1 * | 1/2002 | Garrett | H04L 12/2801 709/225 |
| 2002/0023174 | A1 * | 2/2002 | Garrett | H04L 12/2801 709/245 |
| 2002/0032871 | A1 | 3/2002 | Malan et al. | 713/201 |
| 2003/0002436 | A1 | 1/2003 | Anderson et al. | 370/218 |
| 2003/0043781 | A1 * | 3/2003 | Proctor | H04L 29/12311 370/352 |
| 2003/0061321 | A1 * | 3/2003 | Roh | H04L 12/2856 709/222 |
| 2003/0063591 | A1 * | 4/2003 | Leung | H04L 12/1886 370/338 |
| 2003/0172307 | A1 * | 9/2003 | Henry | H04L 61/2015 713/171 |
| 2003/0202513 | A1 * | 10/2003 | Chen | H04L 12/462 370/390 |
| 2003/0225964 | A1 * | 12/2003 | Krishnan | G06F 21/604 711/108 |
| 2004/0064559 | A1 | 4/2004 | Kupst et al. | 709/226 |
| 2004/0071164 | A1 * | 4/2004 | Baum | H04L 29/12018 370/469 |
| 2004/0111640 | A1 | 6/2004 | Baum | 713/201 |
| 2004/0258074 | A1 | 12/2004 | Williams et al. | 370/395.5 |
| 2005/0027837 | A1 | 2/2005 | Roese et al. | 709/223 |

OTHER PUBLICATIONS

Cisco IOS Software Release 12.1 (19) EW for the Cisco Catalyst 4500 Series Supervisor Engines II-Plus, III, and IV, Jun. 23, 2003; 9 pages.

Chapter 31, *Understanding and Configuring Dynamic ARP Inspection*, Cisco Catalyst 4500 Series Switch Cisco IOS Software Configuration Guide—12.1(19)EW, pp. 31-1 thru 31-10, Jun. 23, 2003.

Configuring Unicast Reverse Path Forwarding; Aug. 21, 2003; 16 pages; http://www.cisco.com/univercd/cc/td/doc/product/software/ios122/122cgcr/fsecur_c/fothersf/scfrpf.htm (printed Oct. 18, 2004).

Understanding and Configuring IGMP Snooping and Filtering; Cisco IOS Software Configuration Guide—Release 12.1(12c)EW, Jul. 11, 2003, Updated Aug. 24, 2004; 16 pages; http://www.cisco.com/univercd/cc/td/doc/product/lan/cat4000/12_1_12/config/multi.pdf (printed Oct. 22, 2004).

M. Patrick, Motorola BCS, Network Working Group—Standards Track, "DHCP Relay Agent Information Option," Jan. 2001, pp. 1-14, Request for Comments 3046, http://www.freesoft.org/CIE/RFC/Orig/rfc3046.txt.

"Chapter 17: Understanding and Configuring DHCP Snooping," Cisco IOS Software Configuration Guide—Release 12.1(12c)EW, Jul. 11, 2003, pp. 17-1-17-4.

* cited by examiner

SYSTEM AND METHOD FOR FILTERING NETWORK TRAFFIC

RELATED APPLICATIONS

This application is a continuation of U.S. patent application Ser. No. 10/971,523 entitled "System and Method for Filtering Network Traffic," filed Oct. 22, 2004, and naming Dehua Huang, Adam J. Sweeney, Richard A. Johnson, and Silviu Dobrota as inventors, which is a continuation-in-part of U.S. patent application Ser. No. 10/654,388, entitled "System and Method for Maintaining Protocol Status Information in a Network Device," filed Sep. 3, 2003, and naming Dehua Huang, Adam J. Sweeney, Richard A. Johnson, and Silviu Dobrota as inventors, which are hereby incorporated by reference herein, in their entirety and for all purposes.

FIELD OF THE INVENTION

The present invention relates to networking and, more specifically, to network devices that convey protocol messages implementing a network protocol between protocol clients and protocol servers and that use information in those protocol messages to restrict traffic between a protocol client and a network.

BACKGROUND

Various network protocols are used to provide networking services to devices. For example, DHCP (Dynamic Host Configuration Protocol) allows the dynamic assignment of IP (Internet Protocol) addresses to hosts. Network protocols such as DHCP are often implemented using a client-server model in which protocol clients request services from protocol servers, which in turn provide the requested services in accordance with the network protocol. For example, in DHCP, a DHCP client may request an IP address from a DHCP server. In response, the DHCP server sends a reply assigning an IP address to the requesting DHCP client. Thereafter, the DHCP client uses the assigned IP address in a manner consistent with the protocol.

Protocol servers that provide networking services are vulnerable to various attacks. A denial of service attack may involve a user simulating a large number of protocol clients in order to exhaust the server's available pool of resources. A denial of service attack may also involve a user sending a high rate of client requests to the protocol server in order to inhibit the ability of the protocol server to respond to legitimate client requests.

Similarly, some users may falsify or steal protocol information in order to perform undesirable activity via a network. For example, a user may simulate a protocol server and send fake protocol responses. These responses may corrupt legitimate network operation. Similarly, a user may snoop a response sent by a legitimate protocol server to a protocol client and use the network services being provided in those responses. For example, if a DHCP response assigning an IP address to a client is intercepted, the intercepting user may deceptively pretend to be the client by using the IP address obtained from the DHCP response. As these examples show, network protocols may experience various security problems that result from misuse of the network protocol and/or attacks on protocol servers.

SUMMARY

Various embodiments of systems and methods for maintaining protocol status information that includes protocol information generated by a protocol server and information indicative of how messages are conveyed via a network are disclosed. This protocol status information can then be used to perform traffic filtering by dropping messages that are not consistent with the protocol status information. Such systems and methods may be used to inhibit the misuse of one or more network protocols and/or attacks on protocol servers.

In some embodiments, a method involves comparing message information and protocol status information. The message information is associated with a first message. The protocol status information is obtained in response to one or more second messages, which are conveyed according to a protocol used to assign network addresses to clients. The method also involves determining whether to discard the first message, based on an outcome of the comparison of the message information and the protocol status information. For example, it can be determined that the first message should be discarded, if the message information does not match the protocol status information.

The protocol status information can be generated in response to the one or more second messages and stored in a binding table entry. In one embodiment, each binding table entry includes information that identifies an Internet Protocol (IP) address of a client, a Media Access Control (MAC) address of the client, and an interface coupled to the client.

At least some of the comparison of the message information to the protocol status information can be performed in response to an access control rule. For example, the access control rule can require that a message received via the interface be dropped unless a IP source address of the message matches the IP address of the client identified in the protocol status information. The access control rule can also require a message received via the interface to be dropped unless a MAC source address of message matches the MAC address of the client. Information encoding the access control rule can be updated each time that a corresponding binding table entry is updated.

A second access control rule can specify that a Dynamic Host Configuration Protocol (DHCP) message received via the interface be processed by a snooping agent. The snooping agent is configured to update protocol status information in the binding table in response to DHCP messages. The second access control rule can also require that a DHCP message received via any one of several interfaces (or even all interfaces belonging to a particular VLAN or network device) be processed by the snooping agent. Thus, a single access control rule (e.g., stored in a single entry of an access control list) can be used to detect DHCP messages received via multiple interfaces and to cause those detected DHCP messages to be processed by the snooping agent.

In one embodiment (e.g., an embodiment supporting private VLANs), a binding table entry, which stores protocol status information, is updated in response to detecting a first protocol message, which is being conveyed from a DHCP server in a first VLAN (e.g., a primary VLAN). This protocol status information can be used when determining whether to discard a non-protocol message being conveyed in a second VLAN (e.g., a secondary VLAN).

In some embodiments, a network device includes a binding table and a filtering module coupled to the binding table. The binding table is configured to store protocol status information. The protocol status information is obtained in response to one or more first messages, which are conveyed according to a protocol used to assign network addresses to clients. The filtering module is configured to compare message information with the protocol status information. The message information is associated with a second message. The filtering module is configured to determine whether to discard the second message, in response to comparing the message information with the protocol status information.

The foregoing is a summary and thus contains, by necessity, simplifications, generalizations and omissions of detail; consequently, those skilled in the art will appreciate that the summary is illustrative only and is not intended to be in any way limiting. The operations disclosed herein may be implemented in a number of ways, and such changes and modifications may be made without departing from this invention and its broader aspects. Other aspects of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
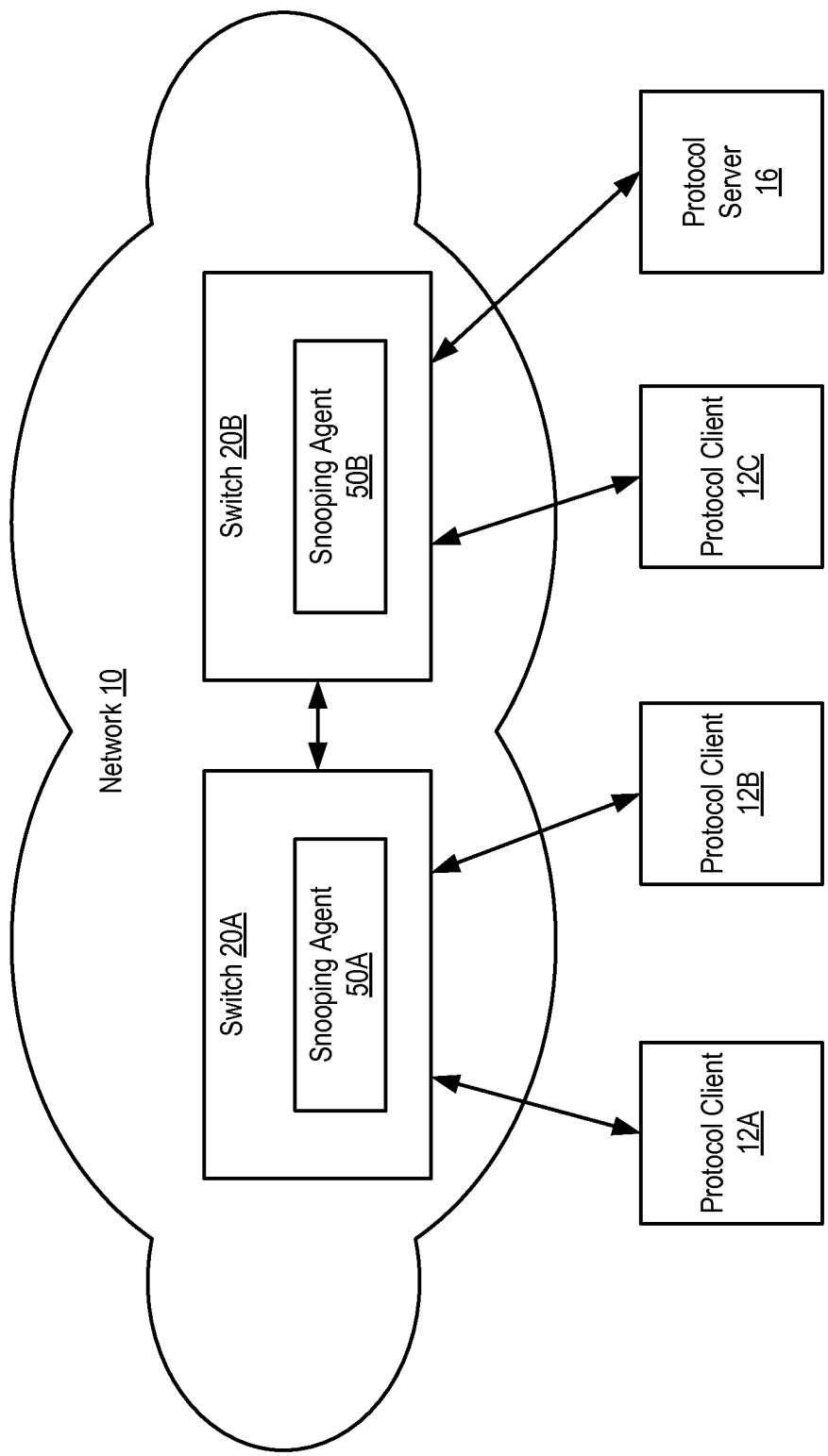
FIG. 1 is a block diagram of network coupling protocol clients to a protocol server, according to one embodiment.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

The following sets forth a detailed description of at least the best contemplated mode for implementing the devices and/or processes described herein. The description is intended to be illustrative and should not be taken to be limiting.

Protocol Snooping

FIG. 1 is a block diagram of network 10 coupling protocol clients 12A-12C (collectively, protocol clients 12) to protocol server 16, according to one embodiment. Network 10 includes several network devices, including switches 20A-20B (collectively, switches 20). Note that other embodiments may include significantly more network devices (and network devices of different types, such as routers) in network 10. Each switch 20 in network 10 may be configured to handle messages from other network devices and from various computing devices coupled by the network 10. At least some of these messages may be protocol messages being sent between protocol clients 12 and protocol server 16.

In a communications network such as network 10, switching devices such as switches 20 operate by receiving data at one of a set of input interfaces and forwarding the data on to one or more of a set of output interfaces. Users typically require that such switching devices operate as quickly as possible in order to maintain a high throughput. Switches are typically data-link layer devices that enable multiple physical network (e.g., local area network (LAN) or wide area network (WAN)) segments to be interconnected into a single larger network. Switches 20 are, in some embodiments, implemented as OSI (Open Systems Interconnection) layer 2 devices. Switches 20 can include logic and/or software that provides for the forwarding of messages based on the messages' destination information.

The data received and forwarded by switches 20 is logically grouped into one or more messages. Throughout this disclosure, the term "message" is used to refer to a logical grouping of information sent as a data unit over a transmission medium. Messages may include header and/or trailer information that surrounds user data contained in the data unit. For purposes of this disclosure, a "message" may include a cell, datagram, frame, packet, segment, or any other logical group of information.

Switches 20 include various interfaces to protocol clients 12 and protocol server 16. These interfaces may include physical interfaces (e.g., on a line card internal to a switch) and/or logical interfaces (also referred to as virtual interfaces). For example, a physical interface that receives messages for several VLANs (Virtual Local Area Networks) can include several logical interfaces, one for each VLAN. Alternatively, a logical interface can be an interface that is located on a physically separate intermediate network device, coupled between the switch and a group of protocol clients, that passes messages sent by the protocol clients to the switch without making forwarding decisions (this type of interface is also described as a remote interface). Furthermore, the interfaces may be organized in various ways. For example, in some embodiments, interfaces are organized hierarchically. In one such embodiment, physical interfaces within a switch reside at the top level of the hierarchy. A physical interface to devices in several different VLANs can include several VLAN-specific logical interfaces that are organized beneath the physical interface in the switch's interface hierarchy.

In some embodiments, protocol clients 12 and protocol server 16 each include one or more of various types of computing devices. For example, protocol clients 12 and/or protocol server 16 can each be a personal computer, a workstation, an Internet server, a network appliance, a handheld computing device such as a cell phone or PDA (Personal Data Assistant), or any other type of computing device. Protocol clients 12 and protocol server 16 can also be implemented in software processes executing on such computing devices.

Protocol clients 12 and protocol server 16 can each be directly or indirectly connected to one of switches 20. For example, in some embodiments, protocol clients 12A and 12B are coupled directly to switch 20A (e.g., switch 20A is included in a wiring closet on the same site as protocol clients 12A and 12B). In other embodiments, protocol clients 12A and 12B are indirectly coupled to switch 20A through one or more intermediate network devices that send messages received from protocol clients 12A and 12B to switch 20A. Similarly, switches 20A and 20B can be directly or indirectly coupled to each other. For example, one or more routers (as well as one or more other switches or other network devices) can be interposed between switch 20A and switch 20B.

Protocol server 16 provides network services to protocol clients according to a network protocol. For example, in one embodiment, protocol server 16 is configured to implement a DNS (Domain Name System) server. A protocol client 12 can request an IP (Internet Protocol) address that corresponds to a particular domain name from DNS protocol server 16. DNS protocol server 16 responds by sending the protocol client 12 a message that includes the requested IP address according to the DNS protocol. Protocol client 12 can then use the IP address assigned by the DNS protocol server 16 to communicate with other clients via network 10.

In another embodiment, protocol server 16 is configured to implement a DHCP (Dynamic Host Configuration Protocol) server. A protocol client 12 may send a message requesting an IP address from protocol server 16. In response to the request, protocol server 16 sends a message assigning an IP address to the protocol client 12.

In other embodiments, many additional network service protocols can be implemented in addition to and/or instead of DNS and DHCP. For example, in another embodiment, protocol server 16 is a Reverse ARP (Address Resolution Protocol) server.

Each switch 20 (and/or router or other network device in network 10) includes a snooping agent 50. As shown in FIG. 1, switch 20A includes snooping agent 50A and switch 20B includes snooping agent 50B.

Each snooping agent 50 is configured to intercept protocol messages being sent between protocol clients 12 and protocol server 16 via network 10. In response to the intercepted protocol messages, snooping agent 50 updates protocol status information locally to a network device (e.g., switch 20 or a router) in which snooping agent 50 is implemented. Thus, each snooping agent 50 is an example of a means for updating protocol status information in response to intercepting a protocol message being conveyed between a protocol client and a protocol server. This protocol status information includes network traffic information indicative of how messages (both protocol messages and non-protocol messages) are conveyed to network 10 by each of protocol clients 12. For example, snooping agent 50A can store information indicating which of the physical and/or logical interfaces included in switch 20A received a protocol message from client 12B requesting a network service. The protocol status information may also include information included in the protocol messages themselves. For example, snooping agent 50A can store information, such as an IP address, included in protocol server 16's reply to the protocol request from client 12B. Thus, the protocol status information can also include protocol information generated by protocol server 16. Each snooping agent 50 can then use its protocol status information to determine whether to perform various security actions such as dropping messages.

Figure 2A:
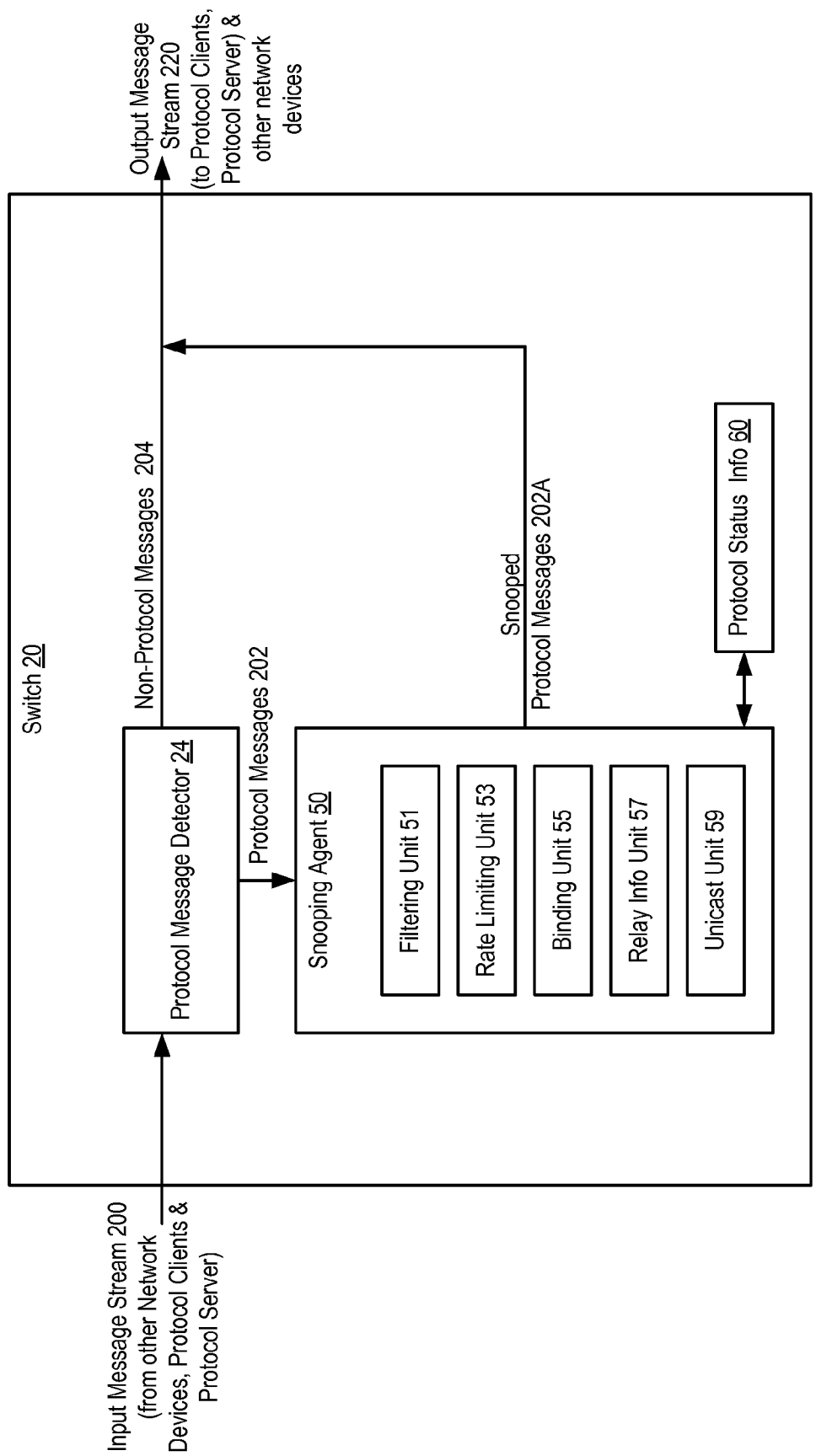
FIG. 2A shows a block diagram of a switch configured to snoop protocol messages being conveyed via a network and to update protocol status information in response to the snooped protocol messages, according to one embodiment.

FIG. 2A shows a block diagram of a switch 20 that snoops protocol messages being conveyed via a network and updates protocol status information in response to the snooped protocol messages. As shown in FIG. 2A, switch 20 includes a protocol message detector 24, a snooping agent 50, and a storage unit that stores protocol status information 60. Protocol status information 60 can be stored in various types of memory, including ROM (Read Only Memory), RAM (Random Access Memory), MEMS (Micro Electro-Mechanical Systems) memory, Flash memory, and the like.

As shown in FIG. 2A, switch 20 may receive an input message stream 200 via various logical and/or physical interfaces. The input message stream 200 may include various protocol messages 202 being conveyed between protocol server 16 and protocol clients 12 of FIG. 1. Additional messages 204 (e.g., data messages or messages implementing other protocols that are not intercepted by snooping agent 50) being conveyed via network 10 of FIG. 1 may also be included in the input message stream 200. Once the protocol messages 202 identified by protocol message detector 24 are processed by snooping agent 50, snooped protocol messages 202A (which may include modified versions of the protocol messages 202 input to snooping agent 500 and/or fewer messages than input protocol messages 202) are output with non-protocol messages 204 as part of output message stream 220 to other network devices, protocol clients, and/or protocol servers).

Figure 2B:
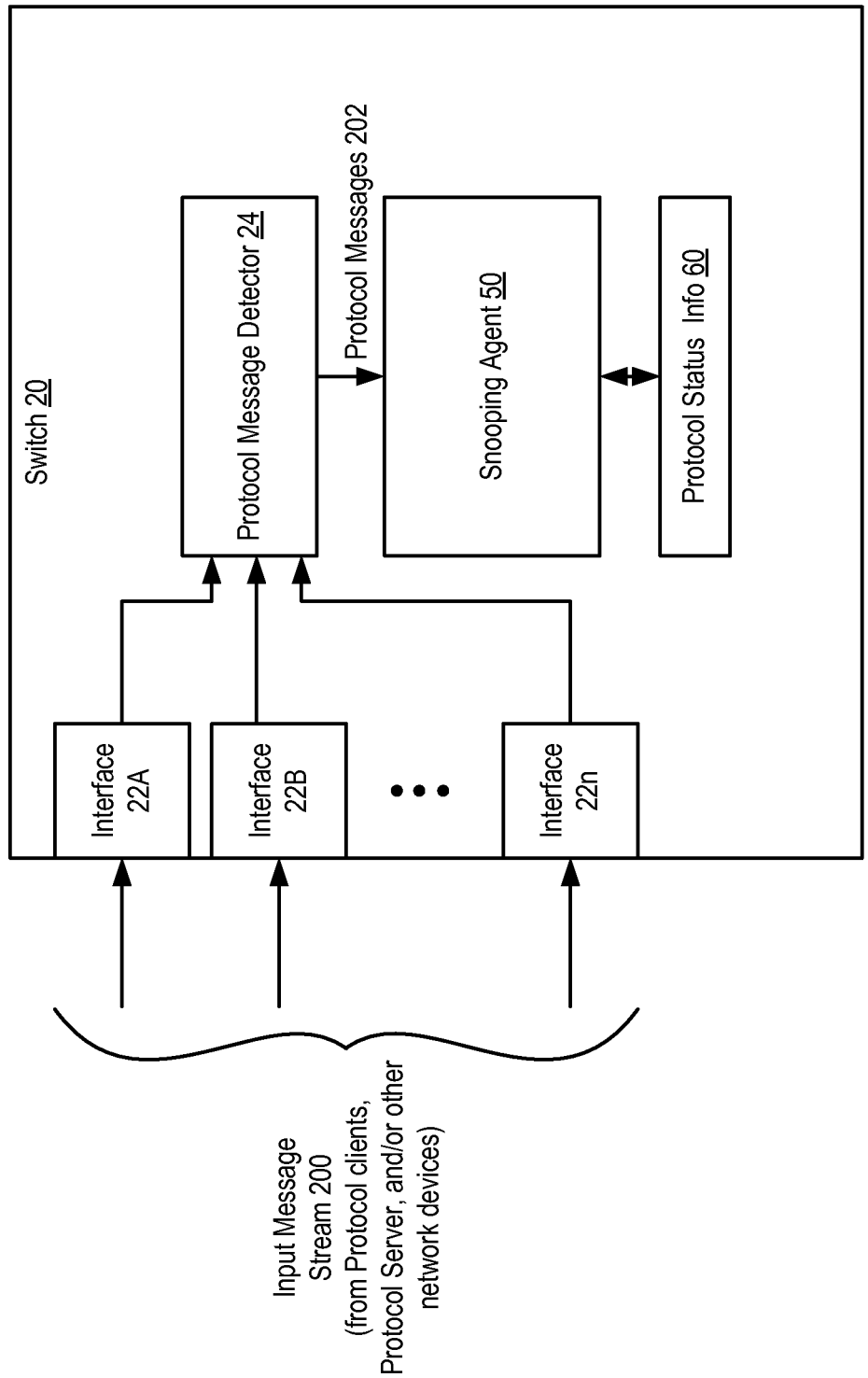
FIG. 2B shows another block diagram of a switch configured to snoop protocol messages being conveyed via a network and to update protocol status information in response to the snooped protocol messages, according to one embodiment.

FIG. 2B illustrates how switch 20 may include several interfaces 22A-22n (collectively, interfaces 22) that each interface to one or more other network devices, protocol clients, and/or protocol servers. Interfaces 22 can each be a logical or a physical interface. For example, interfaces 22A-22B can be included in the same physical interface, but interface 22A may handle messages being conveyed in one VLAN while interface 22B handles messages being conveyed in another VLAN. As noted above, in some embodiments, interfaces 22 can be organized hierarchically.

Returning to FIG. 2A, protocol message detector 24 is configured to identify protocol messages 202 that are received in input message stream 200. In one embodiment, protocol message detector 24 can be implemented using a CAM (Content Addressable Memory) and/or ACL (Access Control List). For example, information from each message can be input into a CAM, which responds by outputting a corresponding index, which is then used to lookup information in an ACL. If the message is a protocol message, the indexed information in the ACL may indicate that the protocol message should be handled by snooping agent 50. Alternatively, protocol message detector 24 can be implemented as a software process that analyzes each message in order to identify which messages are protocol messages. In other embodiments, other types of software and/or hardware can be used to implement protocol message detector 24.

In some embodiments, information in each message that identifies a source and/or destination software port is used by protocol message detector 24 to identify protocol messages. For example, if protocol messages requesting network services provided by the DNS protocol are addressed to server port 53, protocol message detector 24 can readily identify protocol messages to server port 53 as DNS protocol messages.

Whenever protocol message detector 24 identifies a protocol message (e.g., if the protocol being snooped is DHCP, protocol message detector 24 can identify DHCP messages in the message stream based on the software port to or from which the messages are addressed, as described above), the protocol message detector 24 causes the identified protocol message to be forwarded to snooping agent 50. For example, in one embodiment, protocol message detector 24 generates an interrupt, causing a software process implementing all or part of snooping agent 50 to be initiated to handle the identified protocol message. Snooping agent 50 can include a queue (not shown) to temporarily buffer protocol messages identified by protocol message detector 24.

In some embodiments, protocol message snooping is limited to a particular VLAN (Virtual Local Area Network) or performed differently depending on the VLAN in which the protocol message is being conveyed. In these situations, protocol message detector 24 also takes VLAN into account when identifying protocol messages within the input message stream. For example, if protocol message snooping is enabled for one VLAN but not for another, protocol message detector 24 only identifies protocol messages being conveyed in the VLAN for which snooping is enabled.

In response to receiving protocol messages detected by protocol message detector 24, snooping agent 50 performs various functions on and/or in response to the protocol messages. In the embodiment of FIG. 2A, snooping agent 50 includes filtering unit 51, rate limiting unit 53, binding unit 55, relay information unit 57, and unicast unit 59. In other embodiments, snooping agent 50 may include fewer or additional functional units. Snooping agent 50 can be implemented in hardware, software, or a combination of the two.

Filtering unit 51 filters protocol messages that are not consistent with protocol status information 60 from the message stream (e.g., by dropping those messages). In one embodiment, filtering unit 51 can verify a protocol message by comparing information included in a particular protocol message with information stored in protocol status information 60. If the information does not match, filtering unit 51 drops the message. For example, filtering unit 51 can handle a protocol message that includes information indicating that the protocol message is a reply from a protocol server to a protocol client. Filtering unit 51 accesses information included in protocol status information 60 to determine whether the protocol client currently has an outstanding protocol request. If there is no corresponding outstanding request, filtering unit 51 drops the reply. In some embodiments, performing this type of filtering makes it more difficult for a protocol server to be imitated by another device coupled to the network.

Similarly, filtering unit 51 can determine whether a protocol message (or non-protocol message) that includes information indicating that the message was sent by a particular client or server was actually sent by that client or server. This determination is based on information in protocol status information 60 indicating what network services (e.g., IP addresses) have been provided to particular clients and how protocol clients convey messages to the network. For example, protocol status information 60 can include network traffic information associating each client and each server with a particular interface 22 of switch 20. This information is typically obtained by snooping agent 50 the first time a protocol message from each client and each server is received into the switch 20 (in some embodiments, such information may also be obtained in response to non-protocol messages). This information is then maintained in protocol status information 60.

If a subsequent protocol or non-protocol message purporting to be from a particular client or server is received via a different interface than the interface identified in protocol status information 60 as being associated with that client or server, filtering unit 51 drops the message. This type of filtering interferes with the ability of a device coupled to the network to imitate a legitimate protocol client or server. Types of filtering such as this can be used to verify non-protocol messages being sent by a protocol client to a device other than a protocol server.

Rate limiting unit 53 drops protocol messages if a rate limit for protocol messages is exceeded. Information indicating the rate limit is included in protocol status information 60 in some embodiments. Depending on the embodiment, rate limiting may be performed on a per interface and/or per type (e.g., client-generated or server-generated) of protocol message basis. For example, client-generated protocol messages can be rate limited, while server-generated protocol messages are not rate limited. Alternatively, an independent rate limit can be associated with each interface (or group of interfaces). The rate limiting unit 53 applies the associated rate limit to protocol messages being communicated via a particular interface. If the rate limit at a particular interface (or group of interfaces) is exceeded, rate limiting unit 53 can disable that interface (or group of interfaces).

In one embodiment, rate limiting unit 53 implements a rate limiting algorithm based on the time at which a protocol message is received and the current value of a counter indicative of how many protocol messages have already been received during a given time interval. The counter can be associated with a particular interface (e.g., each interface 22 of FIG. 2B can have an associated counter, in one embodiment) or with a group of interfaces. The counter is reset periodically or reset based on certain conditions. Each time a new protocol message is received via an associated interface, rate limiting unit 53 increments the counter. For each protocol message received via the associated interface, rate limiting unit 53 compares the value in the counter to the rate limit for the associated interface. If the comparison indicates that the rate limit is exceeded, rate limiting unit 53 drops the protocol message, disables the associated interface, and/or logs an error message.

Binding unit 55 stores information obtained from intercepted protocol messages as part of protocol status information 60. For example, in an embodiment in which snooping agent 50 snoops DHCP messages, binding unit 55 can store an IP address assigned to a DHCP client by a DHCP server as part of protocol status information 60. Binding unit 55 can also store additional information identifying the DHCP client with that IP address. For example, binding unit 55 can store the DHCP client's MAC (Media Access Control) address and information identifying the VLAN in which that DHCP client is included. Binding unit 55 can also store information indicating how messages are communicated to that DHCP client. For example, binding unit 55 can store information identifying which interface 22 is coupled to receive messages from that DHCP client. Binding unit 55 also modifies (e.g., by changing, supplementing, and/or deleting) existing protocol status information 60 in response to subsequent protocol messages.

The integrity of protocol status information 60 affects how well filtering unit 51 identifies protocol messages to filter from the message stream. Accordingly, binding unit 55 can be configured to only modify protocol status information 60 in response to a snooped protocol message if that message has already been verified as being consistent with protocol status information 60 by filtering unit 51. This way, binding unit 55 will not modify protocol status information 60 in response to a protocol message that is filtered by filtering unit 51.

In some embodiments, binding unit 55 updates protocol status information 60 in response to protocol messages that are received via an interface to protocol clients and/or servers but does not update protocol status information 60 in response to protocol messages received via an interface to another network device that includes its own snooping agent 50. Stated another way, if switch 20 is the first switch (or other network device that includes snooping agent 50) in network 10 to handle messages sent by a particular protocol client, binding unit 55 updates protocol status information 60 in response to messages sent to and/or from that protocol client. If switch 20 is not the first switch in network 10 to handle messages sent by that protocol client, binding unit 55 will not update protocol status information 60 in response to messages to and from that protocol client. In this way, each switch in network 10 may be responsible for maintaining protocol status information 60 for a subset of the total group of protocol clients and/or servers coupled by the network. For example, looking at FIG. 1, switch 20A is responsible for updating its protocol status information in response to protocol messages to and from protocol clients 12A and 12B, while switch 20B is responsible for updating its protocol status information in response to protocol messages to and from protocol client 12C and protocol server 16.

Information indicating which interfaces 22 are coupled to protocol clients and/or servers and which interfaces 22 are coupled to other network devices may be programmed into switch 20 in some embodiments. For example, configuration information indicating which interfaces 22 are coupled to other network devices that include snooping agents 50 and which interfaces 22 are coupled to protocol clients may be loaded into a memory device included in switch 20 by a network administrator. Alternatively, each switch can learn which of its interfaces are coupled to protocol clients and/or servers, as opposed to being coupled to other network devices, by snooping protocol and/or non-protocol messages and updating protocol status information 60 to include information indicative of network traffic in response to the snooped messages, as described above.

Binding unit 55 may store information, generated by a protocol server, indicating how assigned network services may be used by a protocol client to which those services are assigned (such information may be stored in binding table 70, as described below with respect to FIG. 2C). For example, in certain protocols such as DHCP, assigned network services can be associated with lease times indicative of how long a client is allowed to continue using its assigned network services. In embodiments in which protocol messages for such a protocol are being snooped, binding unit 55 establishes a lease timer (e.g., as a value or set of values in protocol status information 60 that is incremented or decremented periodically). Similar information indicative of how a protocol server has indicated that a network service may be used by a client to which that network service is assigned may also be stored in protocol status information 60. Filtering unit 51 can use this information to determine whether a client is using its assigned network services consistently with the protocol server's limitations on those network services. If a protocol client that sends a protocol message is not using an assigned network service consistently with the information stored by binding unit 55, filtering unit 51 may drop the protocol message.

Relay information unit 57 verifies and/or modifies relay information included in protocol messages. Relay information is information that is be added to protocol messages by network devices (e.g., routers and switches) and used by various network devices to verify certain protocol message behavior. Relay information can be removed from protocol messages before those protocol messages are conveyed to protocol clients. One example of such relay information is provided in RFC 3046, which describes relay information that can be added to DHCP messages. Relay information unit 57 (and/or filtering unit 51) verifies protocol messages based on relay information included within those protocol messages. Relay information unit 57 can also remove relay information from a protocol message before that protocol message is sent to a protocol client. In one embodiment, relay information unit 57 adds relay information to the protocol message if switch 20 is the first network device with a snooping agent in network 10 to handle the protocol message. If switch 20 is not the first network device with a snooping agent in network 10 to handle the protocol message, relay information unit 57 verifies any preexisting relay information.

Unicast unit 59 detects protocol messages being sent from a protocol server to a protocol client and causes the detected messages to be unicast to the destination protocol client instead of being broadcast or multicast to multiple recipients. By unicasting the protocol messages, the ability of a device other than the destination client to snoop the information being provided to the client by the protocol server is inhibited. For example, if a DHCP ACK message is being sent, unicasting the message to the destination client makes it more difficult for another device (which might have received the DHCP ACK if the DHCP ACK had been multicast) to obtain the IP address being assigned to that client. This in turn makes it more difficult for the non-destination client to imitate the destination client device on the network.

In one embodiment, snooping agent 50 performs its various functions in the following order: rate limiting, filtering, binding, add/modify relay information, and unicasting. However, this order is merely an example. Other embodiments may order these functions differently.

In some embodiments, switch 20 snoops protocol messages being sent to implement several different protocols. For example, switch 20 can snoop DHCP, DNS, and Reverse ARP messages, generate protocol status information in response to the snooped messages, and perform security actions based on the protocol status information. In some such embodiments, switch 20 includes multiple protocol message detectors 24 (e.g., one protocol message detector 24 for each protocol being snooped), a single protocol message detector 24 configured to identify protocol messages for multiple different protocols, or a combination of such protocol detectors. Similarly, switch 20 can include multiple protocol-specific snooping agents 50 or, alternatively, one snooping agent 50 can maintain protocol status information for multiple different protocols. In some embodiments, protocol status information for each protocol is maintained independently. In other embodiments, protocol status information for the different protocols is collectively maintained and used to perform security actions. For example, information obtained by snooping DHCP messages can be used to filter DNS messages.

It is noted that snooping agent 50 and/or protocol message detector 24 can be implemented differently in different types of network devices. For example, protocol message detector 24 can be implemented in hardware within a switch 20 while being implemented in software within a router.

Figure 2C:
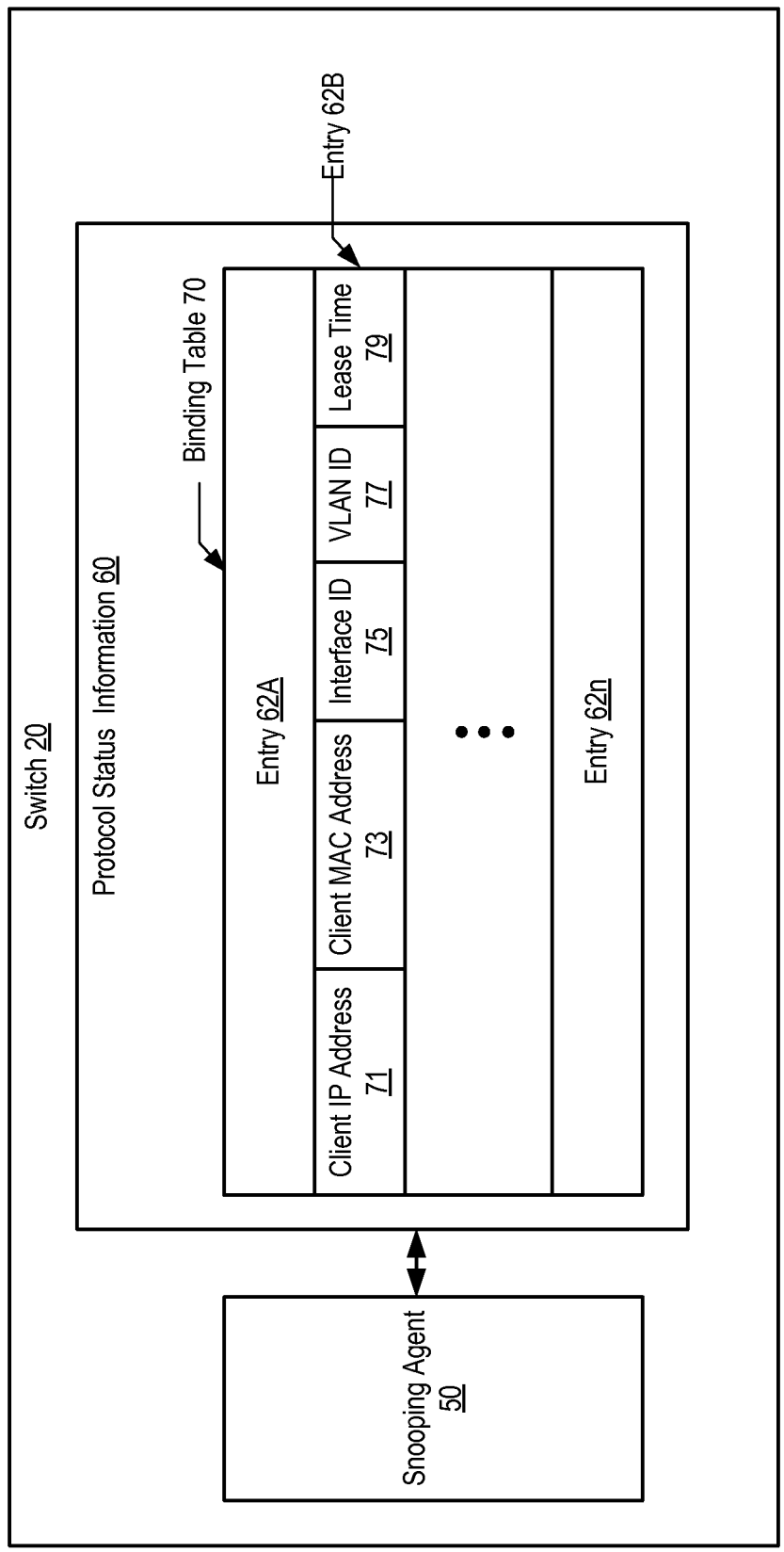
FIG. 2C is yet another block diagram illustrating an example of protocol status information maintained by a network device, according to one embodiment.

FIG. 2C is a block diagram illustrating an example of protocol status information that can be maintained by a network device such as switch 20. In this embodiment, snooping agent 50 intercepts DHCP messages and updates binding table 70 in protocol status information 60 in response to the snooped DHCP messages. Binding table 70 is similar to a binding table typically maintained by a DHCP server. Binding table 70 includes one or more entries 62A-62n (collectively, entries 62) that each correspond to a particular protocol client. As represented by entry 62B, an entry 62 includes client IP address 71, client MAC address 73, interface ID 75 (e.g., identifying the logical and/or physical interface 22 via which messages sent by the client are received into the switch that includes binding table 70), VLAN (Virtual Local Area Network) ID 77 (identifying a VLAN in which the client to which entry 62 corresponds sends protocol messages), and lease time 79. The information illustrated as being included in binding table 70 is merely an example. In other embodiments, different information can be included in a binding table in addition to and/or instead of the information shown in FIG. 2C.

Client IP address 71 may have been generated by protocol server 16 (in this example, a DHCP server) of FIG. 1. Snooping agent 50 obtains client IP address 71 from a protocol message being sent from protocol server 16 to a particular protocol client 12 and stores client IP address 71 in a binding table entry corresponding to that protocol client. Lease time 79 is a value representing the length of time that client IP address 71 may be used by the client to which that IP address is assigned. Snooping agent 50 also obtains this information from the DHCP server reply assigning the IP address to the client.

Snooping agent 50 can obtain other information for storage in binding table 70 from protocol messages generated by clients 12. For example, snooping agent 50 may allocate a binding table entry 62 to a particular client in response to intercepting a DHCP request from that client requesting an IP address from a DHCP server. Snooping agent 50 can obtain client MAC address 73, interface ID 75, and/or VLAN ID 77 from the DHCP request and store this information in the allocated binding table entry.

In one embodiment in which DHCP messages are being intercepted, snooping agent 50 responds to a DHCP ACK message (sent from a DHCP server to a DHCP client to assign an IP address to that client) by allocating an entry 62 in binding table 70 to the DHCP client, if such an entry does not already exist. In response to a DHCP NAK message (sent from a DHCP server to a DHCP client to deny assigning an IP address to that client), snooping agent 50 deletes an existing binding table entry (if any) corresponding to that client. A DHCP NAK message is sent when a client attempts to reuse an IP address and the DHCP server determines that the IP address is not applicable to the client (e.g., because the client has moved to a new subnet). Similarly, in response to a DHCP RELEASE message (sent from a client to a DHCP server to relinquish an IP address assigned to that client), snooping agent 50 deletes an existing binding table entry corresponding to that client. If a DHCP DECLINE message (sent from a client to a DHCP server in response to the client discovering that an IP address is already assigned to another device) is received, snooping agent 50 deletes an existing binding table entry (if any) corresponding to that client.

Generally, snooping agent 50 stores various information, such as an IP address, identifying a network service provided by a protocol server to a protocol client in a binding table entry associated with a particular client. Snooping agent 50 can also store other information identifying that client, such as a client MAC address and an interface ID, in the binding table entry. Snooping agent 50 may use this information to verify subsequent protocol messages. For example, snooping agent 50 can verify the sender of a particular protocol message by comparing the source IP address, MAC address, and interface ID in a particular message with the information stored in binding table 70. If no entry 62 in binding table 70 includes the same combination of source IP address, MAC address, and interface ID, snooping agent 50 determines that the protocol message was not sent by the client identified as the sender and, in response to that determination, drop the protocol message.

A binding table 70 can also be used to store information, such as lease time 79, indicating how network services provided by a particular protocol are to be used. Snooping agent 50 may use this information to verify that network services (e.g., IP addresses) are being used in a manner that is consistent with the protocol. For example, using lease time information 79, snooping agent 50 can examine intercepted protocol messages to determine whether a client is attempting to use an IP address for longer than the client is allowed. If a protocol violation is detected (e.g., if a message sent by a client having a particular IP address is received subsequent to the expiration of the lease time associated with that IP address in the binding table) in a particular message, snooping agent 50 drops that message.

In some embodiments, binding table 70 is implemented as a hash table. To access a binding table entry associated with a particular client, information such as the client's MAC address and VLAN ID is used as a hash key.

Figure 3:
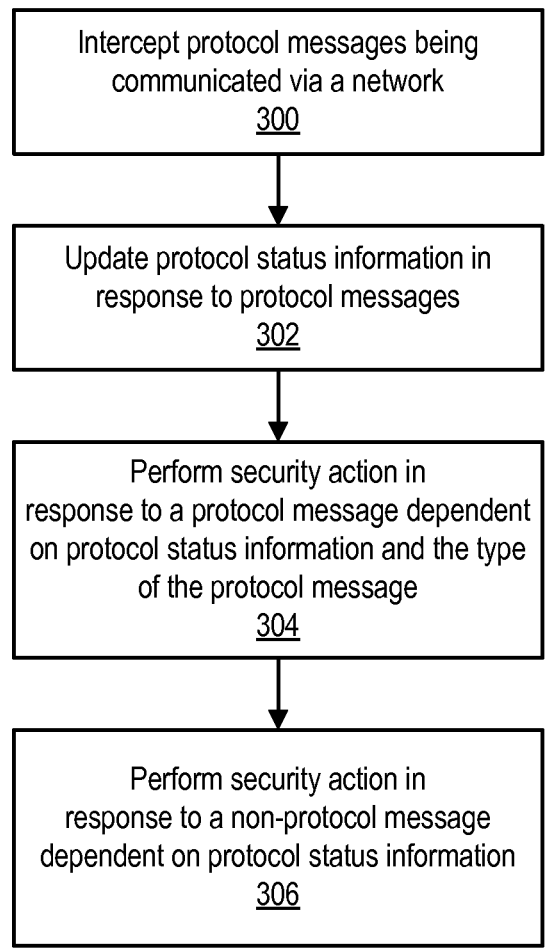
FIG. 3 is a flowchart illustrating one embodiment of a method of snooping protocol messages in order to update protocol status information and to perform security actions dependent on the protocol status information.

FIG. 3 is a flowchart illustrating one embodiment of a method of snooping protocol messages in order to update protocol status information and to perform security actions dependent on the protocol status information. At 300, one or more protocol messages being communicated via a network are intercepted by a network device. The protocol messages are included in a stream of messages input to the network device. In some embodiments, the network device may detect protocol messages based on a server port indicated in the protocol messages.

In response to the intercepted protocol messages, the network device updates protocol status information, as indicated at 302. The protocol status information includes both information included in the protocol messages and information indicative of how the protocol messages are conveyed from one or more protocol clients to the network. For example, in response to receiving a protocol message sent by a protocol client to request a network service, the network device can store information indicating that the protocol request was received via a particular logical and/or physical interface of the network device. The network device can store information indicating that the protocol client has an outstanding protocol request. The network device can also store information included in the protocol request that identifies the client device (e.g., a VLAN ID and/or MAC address). Similarly, in response to a protocol message sent by a protocol server to provide a network service to a client, the network device stores information identifying the network service (e.g., an IP address), the client to which that service is being provided, and/or information (e.g., a lease time) indicating how the client may use the service. The protocol status information can also include information indicative of the rate at which protocol messages are being received from a particular client or group of clients or via a particular interface or group of interfaces.

The network device then uses the protocol status information updated at 302 to determine whether to perform security actions for subsequently received messages. As indicated at 304, the network device performs a security action for a subsequent protocol message dependent on the protocol status information and the type (e.g., client request, server response, and the like) of the subsequent protocol message. Security actions include dropping the protocol message if it includes information that is inconsistent with the protocol status information, updating information included in the protocol message, and/or updating an error log. Note that the network device can also update the protocol status information in response to the subsequently received protocol message.

In some embodiments, the network device also uses the protocol status information to determine whether to perform security actions in response to non-protocol messages, as indicated at 306. For example, a network device may receive, via one of the network device's interfaces, a message containing information indicating that it was sent by a client having a certain IP address, assigned using the network protocol. The network device can verify whether the protocol server assigned that IP address to a client that sends messages to the network via that interface of the network device. If the protocol status information indicates that the client assigned that IP address sends messages to the network via another interface of the network device, or that no client has been assigned that IP address, the network device performs a security action such as dropping the message and/or updating an error log. If the protocol status information instead indicates that the client assigned that IP address does convey messages to the network via that interface of the network device, the network device may allow the message to continue its progress through the network.

Figure 4A:
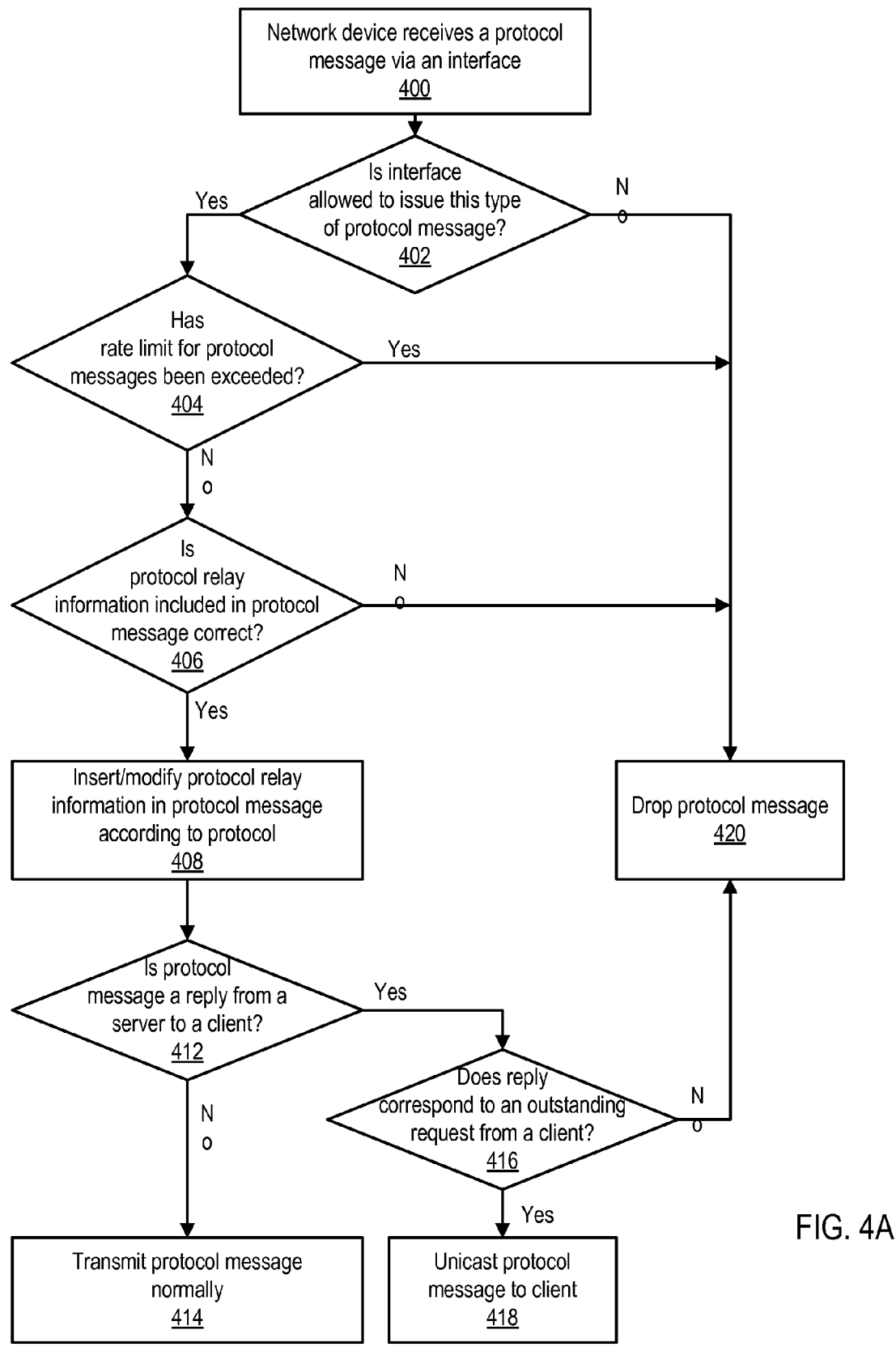
FIG. 4A is a flowchart illustrating various security actions that can be performed dependent upon protocol status information, according to one embodiment.

FIG. 4A is a flowchart illustrating various security actions that can be performed dependent upon protocol status information. In this embodiment, a network device receives a protocol message via a particular logical and/or physical interface, as indicated at 400. Based on protocol status information maintained by that network device, the network device determines whether the interface that received the protocol message is allowed to issue that type of protocol message, as shown at 402. If the interface is not allowed to issue that type of protocol message (e.g., if the interface is not coupled to receive messages from a protocol server, and if the message is of a type that is only allowed to be sent by a protocol server), the network device drops the message, as shown at 420. Otherwise, the network device proceeds to further verify the protocol message at 404.

As indicated at 404, the network device verifies whether a rate limit for protocol messages has been exceeded. If so, the network device drops the protocol message, as shown at 420. The rate of protocol messages can be limited on a per interface (or group of interfaces) and/or a per client (or group of clients) basis in some embodiments.

At 406, the network device verifies whether protocol relay information (if any) included in the protocol message is correct. For example, if the protocol message is a DHCP message, the network device can check to see if another network device has inserted relay information into the protocol message. If so, the network device determines whether the protocol relay information is correct, based on information indicative of the interface via which the message was received.

If the protocol relay information (if any) in the protocol message is correct, the network device can modify or add protocol relay information to the protocol message, as indicated at 408. For example, if no protocol relay information is included in the protocol message (e.g., because this network device is the first network device allowed to add relay information to handle the protocol message), the network device adds protocol relay information to the protocol message. Alternatively, if the network device is outputting the protocol message to a client or server (as opposed to another network device), the network device removes any protocol relay information already included in the message.

If the protocol message is a type of message (e.g., a protocol reply such as a DHCP ACK or DHCP NAK) sent by a protocol server, as determined at 412, the network device accesses the protocol status information to determine whether the protocol message corresponds to an outstanding protocol request from a client, as shown at 416. If the protocol message does not correspond to an outstanding request, the network device drops the protocol message, as shown at 420. Otherwise, the network device unicasts the protocol message to the destination client so that no other clients receive the protocol message, as indicated at 418. If the protocol message is not a type of message sent by a protocol server, the network device transmits the protocol message normally (e.g., if the protocol message is identified as a message that should be flooded or multicast, the network device will appropriately flood or multicast the protocol message), as shown at 414.

Figure 4B:
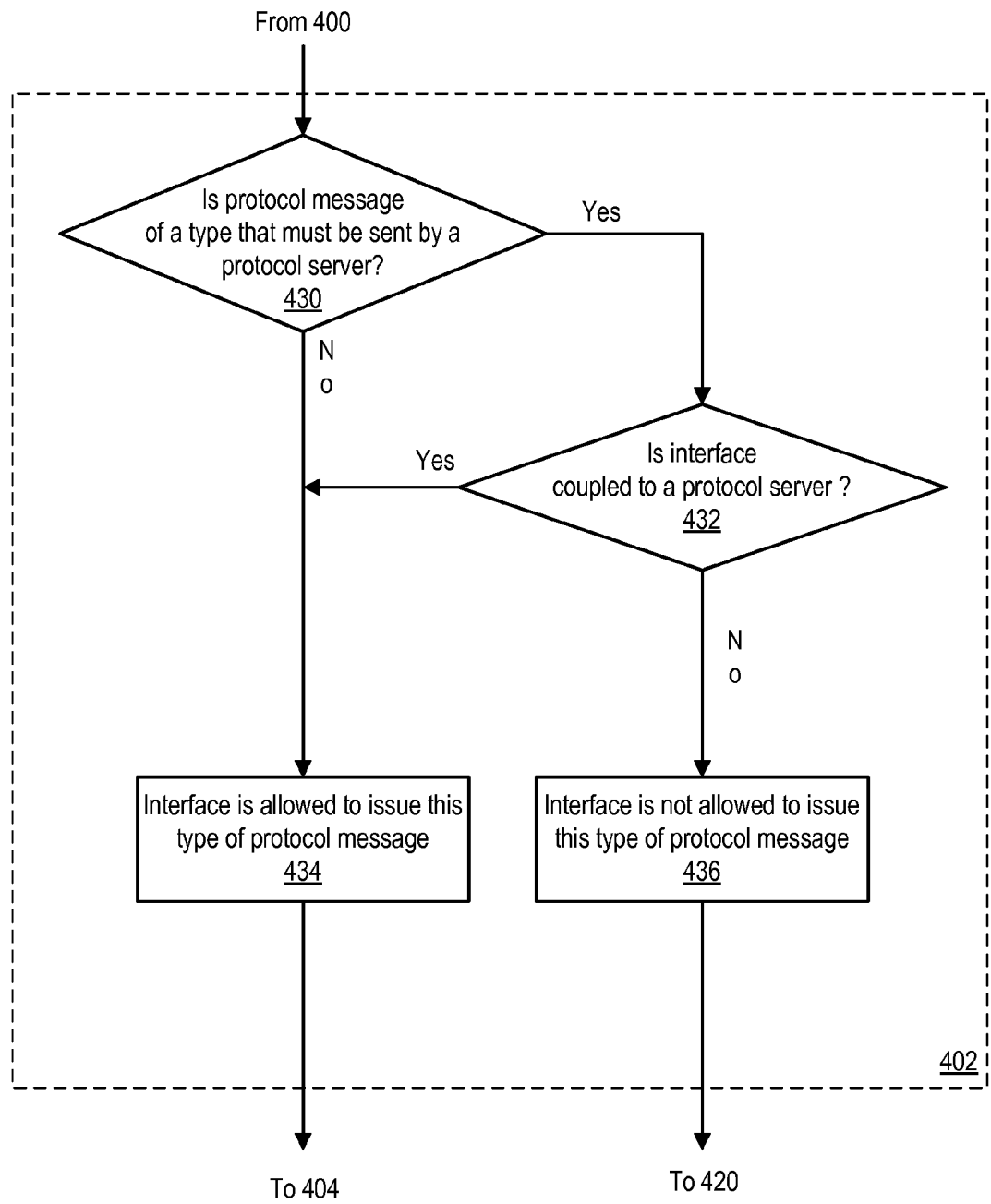
FIG. 4B is a flowchart illustrating additional details of how protocol status information is used to verify protocol messages in the embodiment of FIG. 4A.

FIG. 4B is a flowchart illustrating additional details of how protocol status information is used to verify that a particular interface is allowed to issue a particular type of protocol messages in the embodiment of FIG. 4A. At 430, the network device determines whether the protocol message is of a type that must be sent by a protocol server. For example, if the protocol message is a DHCP message, the network device identifies messages of types DHCP OFFER, DHCP ACK, and DHCP NAK as messages that only a DHCP server is allowed to send. If the protocol message is of a type that is not required to be sent by a protocol server, the network device determines that the interface is allowed to issue this type of protocol message, as shown at 434. Note that in some embodiments, if the protocol message is of a type that may only be sent by a protocol client, the network device additionally verifies whether there are any protocol clients coupled to send messages via that interface before reaching the determination at 434.

If the protocol message is of a type that can only be sent by a protocol server, the network device accesses protocol status information to determine whether the interface via which the protocol message was received into the network device is coupled to receive messages from a protocol server, as shown at 432. If the protocol status information indicates that a protocol server is coupled to that interface, then the network device determines that the interface is allowed to issue that type of protocol message. Otherwise, the network device determines that the interface is not allowed to issue that type of protocol message, as indicated at 436. In response, the protocol message is dropped, as shown at 420 of FIG. 4A.

Figure 5:
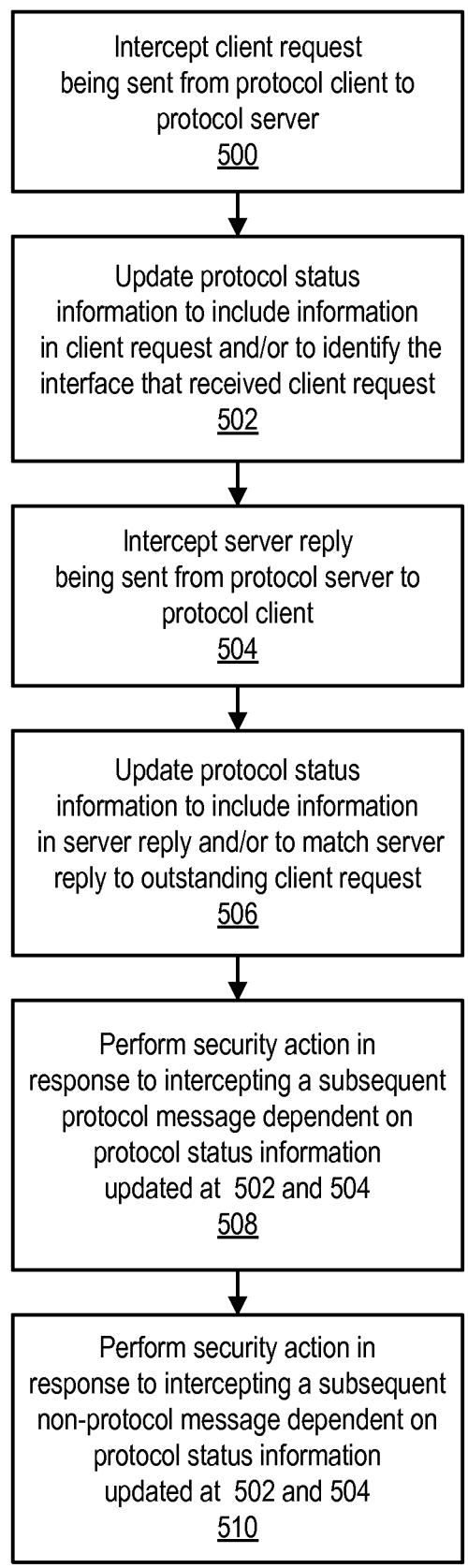
FIG. 5 is a flowchart illustrating how protocol status information is obtained by intercepting a protocol request from a protocol client and a protocol reply from a protocol server and how this protocol status information is then used to verify other protocol messages, according to one embodiment.

FIG. 5 is a flowchart illustrating how protocol status information is obtained from intercepting a protocol request from a protocol client and a protocol reply from a protocol server and how this protocol status information is then used to verify other protocol messages, according to one embodiment. At 500, a protocol message is intercepted. The protocol message contains a client request for network services that is being sent from a protocol client to a protocol client via a network. In response to the intercepted client request protocol message, protocol status information is updated at 502 to include information in the protocol message and/or to identify the interface that received the client request. The protocol status information can also be updated to indicate that the protocol client has an outstanding protocol request.

At 504, a protocol message that contains a protocol server reply is intercepted as the protocol message is being sent from the protocol server to the protocol client. In response, the protocol status information is updated at 506 to include information in the server reply and/or to match the server reply to the outstanding client request intercepted at 500.

Dependent upon the protocol status information updated at 502 and 506, a security action is performed at 508 in response to intercepting a subsequent protocol message. A security action can involve dropping the subsequent protocol message or logging an error. For example, the protocol status information can be used to verify the identity of the sender of the subsequent protocol message, or to determine that a preset rate limit of protocol messages has not been exceeded. Note that the protocol status information can also be updated in response to the subsequent protocol message. In some embodiments, the protocol status information updated at 502 and 506 is also used to determine whether to perform a security action in response to intercepting a subsequent non-protocol message, as indicated at 510.

Message Filtering based on Protocol Snooping

As noted above, the information in the binding table can also be used to filter non-protocol messages. For example, a binding table that stores IP source address and MAC source address for a particular interface can be used to filter non-protocol messages received via that interface. By filtering non-protocol messages, additional security can be provided. For example, if binding table entries store IP source addresses, additional security for IP messages can be provided, so that attackers are inhibited from stealing and using (also referred to as "spoofing") the IP address of an innocent user.

It is noted that, as used herein, "protocol messages" are messages that are conveyed according to a protocol (e.g., DHCP) that is used to assign network addresses to protocol clients. "Non-protocol messages" are messages that are conveyed via a protocol (e.g., IP, IPX (Internetwork Packet Exchange), and the like) other than the protocol that is used to assign network addresses to protocol clients.

Figure 6:
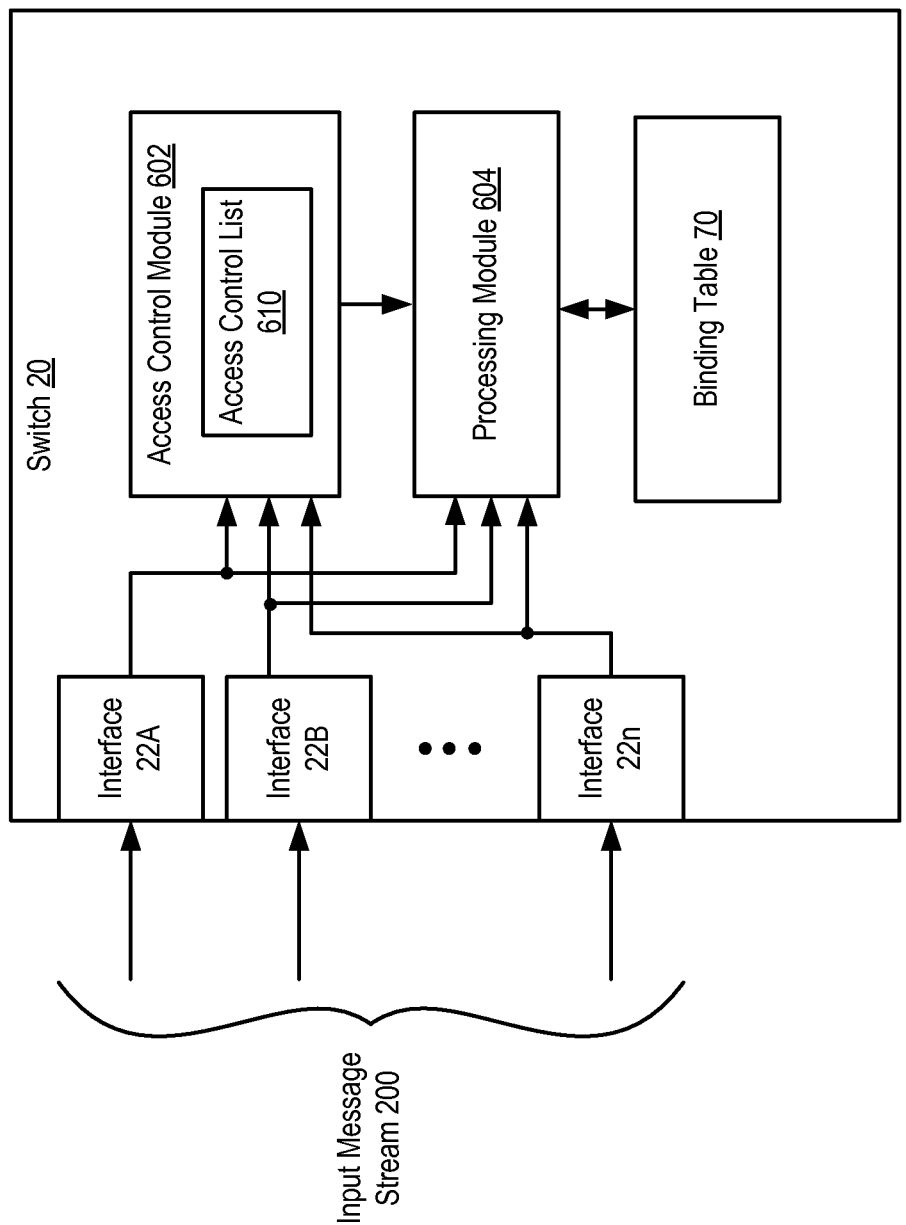
FIG. 6 illustrates an example of a switch that is configured to perform network traffic filtering, according to one embodiment of the present invention.

FIG. 6 shows an example of a switch that uses information collected by a snooping agent to filter non-protocol messages. As shown, switch 20 includes several interfaces 22A-22n, as well as an access control module 602, a processing module 604, and a binding table 70. Input messages are received via interfaces 22A-22n, and control processing for those messages is provided by (at least) access control module 602, processing module 604, and binding table 70. Each interface 22A-22n can be a logical interface (e.g., implemented using EtherChannel) or physical interface. As shown by the arrows, information associated with and/or included in each message received via interfaces 22A-22n can be provided to access control module 602 and/or processing module 604. Binding table 70 includes information obtained by snooping protocol (e.g., DHCP) messages, as described above.

Access control module 602 includes an access control list 610. Access control list 610 stores information encoding access control rules. Access control module 602 uses information associated with each incoming message to identify which access control rules, if any, in access control list 610 should be applied to that incoming message. For example, based on information (e.g., source address, destination address, and VLAN) in the message's IP header, access control module 602 can select that a particular set of access control rules should be applied to the message. Based on whether a message complies with a selected access control rule, access control module 602 can determine whether the message should be dropped, sent to processing module 604 for additional processing, allowed to be routed and/or forwarded normally, and the like. Access control module 602 can output one or more signals (not shown) indicating whether a message should be dropped, receive additional processing by processing module 604, and/or be routed and/or forwarded normally.

In some embodiments, access control module 602 is implemented using ternary content addressable memory (TCAM) to compare information (or selected subsets of that information, as determined by a mask included in each TCAM entry) included in and/or associated with a given message to information that is used to select one or more access control rules. A lookup in the TCAM can select one or more entries in the access control list 610, and the selected entries store information encoding the access control rule to apply to the message.

Processing module 604 can be implemented by one or more processors (e.g., microprocessors, programmable logic devices, application-specific integrated circuits, or the like) and/or memory devices. Processing module 604 can execute software and/or include application specific hardware for performing various tasks, such as implementing snooping agent 50 (as shown in FIG. 2A). Processing module 604 can process information associated with and/or included in messages that are selected by access control module 602. For example, access control module 602 can implement protocol message detector 24 of FIG. 2A, and processing module 604 can implement snooping agent 50 when handling protocol messages 202 detected by protocol message detector 24.

Processing module 604 is coupled to access information in binding table 70. In this example, each time a new entry is allocated in binding table 70, processing module 604 allocates or modifies a corresponding entry in access control list 610. Similarly, if entries are deallocated in binding table 70, processing module 604 can remove or modify the corresponding entries in access control list 610. For example, if snooping agent 50 detects a DHCP ACK message specifying a particular IP address and allocates a binding table entry for that IP address in binding table 70, processing module 604 can update a corresponding entry in access control list 610. Similarly, if snooping agent 50 detects a DHCP RELEASE message for an IP address and, in response, removes or updates the binding table entry for the IP address, processing module 604 can remove the corresponding access control list entry in access control list 610. If a binding table entry is modified, processing module 604 can update the corresponding entry in access control list 610.

Updating an entry in access control list 610 involves calculating an access control rule based on the information in a binding table entry and then storing the access control rule in access control list 610. Each binding table entry associates an network source address with one of interfaces 22A-22n. For example, if the protocol being snooped is used to assign IP address A to a client coupled to switch 20 via interface 22A, a binding table entry can be allocated to store the interface ID of interface 22A and IP address A. It is noted that binding table entries can also store additional information, such as information identifying the client device's MAC address and VLAN.

In one embodiment, at least some access control rules are calculated on a per-interface and per-VLAN basis. Initially, the access control rule for a particular VLAN on a particular interface can indicate that all non-protocol messages (where the protocol is the protocol monitored by protocol message detector 24) should be dropped. Thus, an entry, which corresponds to that interface and VLAN, in access control list 610 indicates that all non-protocol messages received via that interface in that VLAN should be dropped. Another entry can store information encoding a rule that all protocol messages should be passed to snooping agent 50 for handling. Thus, when switch 20 begins operation, all network messages that are not protocol messages will be dropped.

In response to snooping the protocol messages received via that interface, a binding table entry is allocated for that interface and VLAN. In response to the binding table entry, a new access control rule for the interface and VLAN is calculated. This new access control rule combines the pre-existing rule, which indicates that all non-protocol messages should be dropped, with a new rule. The new rule indicates that that all messages received via that interface and VLAN that are not protocol messages or messages having the source address specified in the binding table entry should be dropped. Thus, in response to the binding table entry, the access control rule is updated to allow messages having that source address to be received via the interface (i.e., the updated access control rule will not cause such messages to be dropped). Similar updates can be applied to the access control rule each time corresponding binding table entries are modified or removed.

Switch 20 can allow a user to select whether network traffic filtering, using access control rules based on entries in binding table 70, is enabled. If the network traffic filtering is enabled, access control rules such as those described above will be calculated based on binding table 70. If the network traffic filtering is not enabled, these access control rules will not be calculated. In one embodiment, when switch 20 is powered on, network traffic filtering is disabled. If a user enables network traffic filtering, a default access control rule (e.g., specifying that all non-protocol messages should be dropped) is calculated for each interface that is coupled to a protocol client and/or each VLAN on which network traffic filtering is enabled. These access control rules are then updated based on binding table 70, as described above. If a user disables network traffic filtering during operation of switch 20, any access control rules calculated from entries in binding table 70 can be deleted or recalculated. In some embodiments, network traffic filtering can be enabled and disabled on a per-interface and/or per-VLAN basis. Processing module 604 maintains state information (e.g., in a memory device, not shown) that indicates whether network traffic filtering has been enabled and updates this state information in response to user input to switch 20.

As described above, binding table entries store information associating an network address, assigned by a protocol server, with one of interfaces 22A-22n of switch 20. When such a binding table entry is allocated by snooping agent 50 (shown in FIG. 2A), processing module generates information encoding a rule that allows network traffic from the source address, as identified in the binding table entry, to be received from the interface identified in the binding table entry. This information is stored in an entry in access control list. Subsequently, messages that are received via the identified entry and that have the identified source address will not be dropped.

It is noted that in addition to allocating binding table entries in response to snooped protocol traffic, binding table entries can also be allocated in response to other actions that that associate a network address with a particular interface. For example, a snooping agent 50 can also be configured to allocate binding table entries in response to statically configured network addresses (e.g., IP addresses manually associated with a particular interface by a system administrator). Corresponding access control rules can also be updated based on binding table entries that are allocated in response to statically configured network addresses. Additionally, binding table entries can be allocated in response to other types of snooped protocol traffic, in addition to and/or instead of DHCP, or even in response to information detected within certain non-protocol messages.

Access control module 602 filters messages (e.g., by causing certain messages to be dropped) that are received via a particular interface and have a source address other than the address identified in the access control rule for that interface. This prevents a malicious client device from attacking the network by hijacking a neighboring client device's network address. In some embodiments, network traffic filtering performed using access control module 610 provides per-interface network traffic filtering at "wire speed," such that network traffic filtering has a negligible effect on the performance of switch 20.

As an example, the following rules can be applied to a particular interface if snooping agent 50 has detected that IP addresses IP1 and IP2 are assigned to client devices coupled to that interface: (1) capture all DHCP messages; (2) permit IP traffic from source IP1; (3) permit IP traffic from source IP2; and (4) deny all IP traffic. Rule (1) can be specified in such a way that Rule (1) applies to all interfaces for which protocol snooping has been enabled (i.e., a single access control rule, stored in a single entry of access control list 610, can be used to enable the capturing of protocol messages received via all interfaces). Rule (4) can be encoded in access control list in response to IP traffic filtering being enabled on the interface. A user can enable IP traffic filtering on a particular interface by specifying the particular interface or by specifying the VLAN that includes that interface. If a malevolent client device coupled to that interface attempts to use another IP address (e.g., IP3), messages sent to switch 20 by that malevolent client device will be dropped.

In addition to dropping messages that do not match information in binding table 70, access control module 604 can also perform other security actions. For example, access control module 604 can store information corresponding to each dropped message in a log. An administrator can access such a log in order to obtain information for use in analyzing a network attack. As another example, access control module 604 can cause rate-limited system messages to be displayed on a console and/or sent to an administrator (e.g., using simple network management protocol (SNMP)) each time a message (or number or rate of messages) is dropped.

In some embodiments, more than one protocol client can share the same access interface. Accordingly, there can be more than one network address associated with each interface in binding table 70. Network traffic filtering for all source addresses associated with a given interface can be performed via a single rule encoded in access control list.

In some embodiments, processing module 604 calculates access control rules that filter network traffic based on both a Layer 3 (L3) (e.g., IP, IPX, and the like) source address and a Layer 2 (L2) (e.g., MAC) source address. For example, if an entry in binding table 70 identifies interface 22B, source IP address IP1, and source MAC address MAC-C, processing module can encode a corresponding access control rule in access control list 610. The corresponding access control rule indicates that messages received via interface 22B will be dropped, unless those messages are either protocol messages or messages having source IP address IP1 and source MAC address MAC-C.

In an alternative embodiment, the access control rules encoded in access control list 610 only provide source address filtering based on source L3 address (as opposed to providing source address filtering based on both L3 source address and L2 source address). In some of these alternative embodiments, filtering based on L2 source addresses is not provided. In other embodiments, a separate module (other than access control module 602) is included in switch 20 to perform filtering based on L2 source addresses. For example, a separate utility (e.g., the port security feature of CISCO IOS™ Software, available from Cisco Systems, Inc. of San Jose, Calif.) is used to filter messages received via the interface based on L2 source addresses. This separate utility can use the information in binding table 70 to perform filtering based on L2 source addresses.

It is noted that although the description of FIG. 6 refers to using the information in binding table 70 to snoop IP messages, other embodiments can use similar binding tables to filter other types of non-protocol messages. It is also noted that different protocols (in addition to and/or instead of DHCP) can be snooped for information to include in a binding table.

Figure 6A:
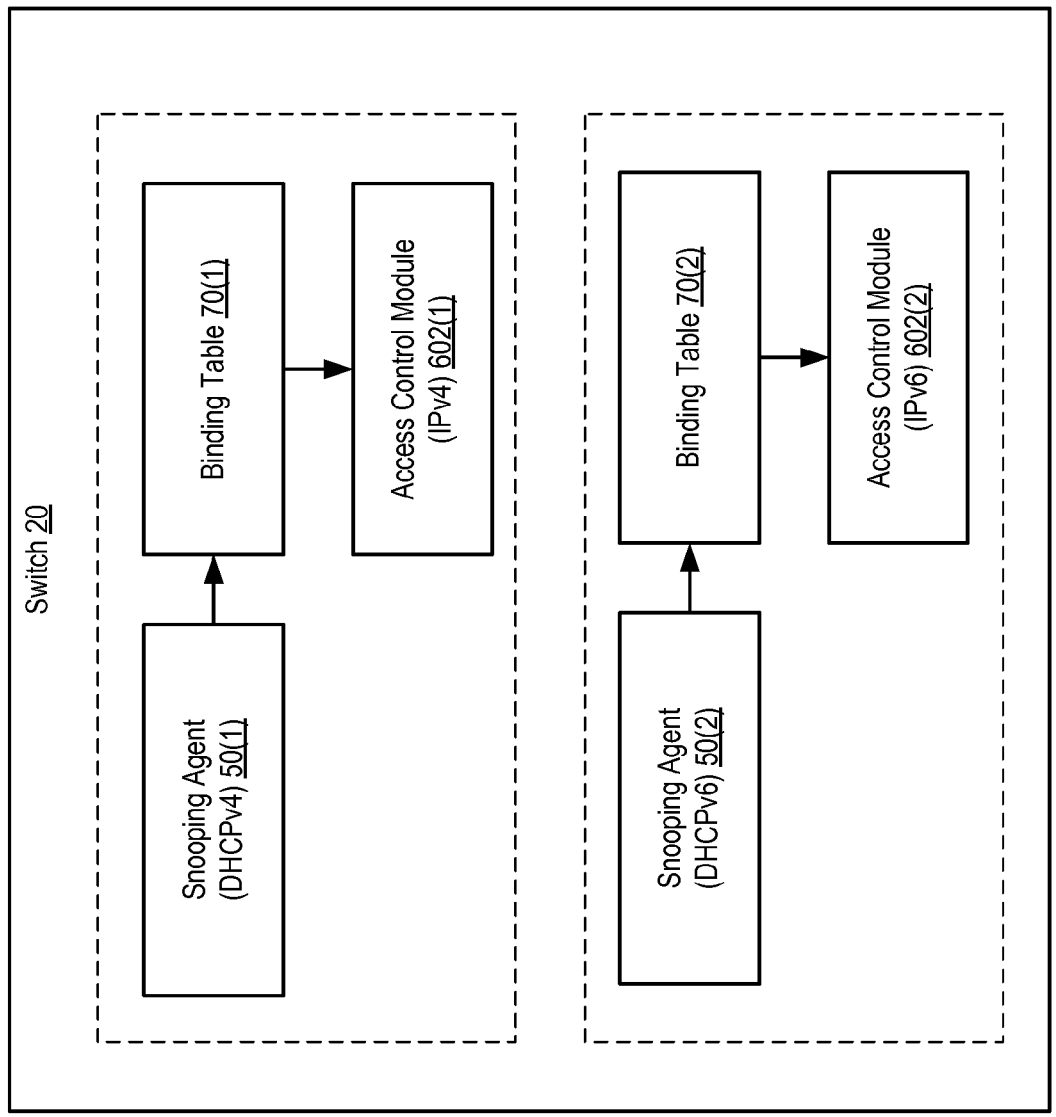
FIG. 6A illustrates another example of a switch, according to another embodiment of the present invention.

In some embodiments, a switch implements the functionality of several different snooping agents, binding tables, and access control modules in order to perform network traffic filtering for several different network protocols. For example, as shown in FIG. 6A, a switch 20 can implement the functionality of a pair of snooping agents 50(1) and 50(2), a pair of binding tables 70(1) and 70(2), and a pair of access control modules 602(1) and 602(2). In this example, snooping agent 50(1) snoops DHCPv4 protocol messages, which are used to assign IPv4 (Internet Protocol version 4) addresses to DHCPv4 clients. Based on snooped DHCPv4 messages, snooping agent 50(1) allocated entries in binding table 70(1). The information in binding table 70(1) can then be used by access control module 602(1) to filter IPv4 network traffic.

Similarly, snooping agent 50(2) snoops DHCPv6 protocol messages, which are used to assign IPv6 (Internet Protocol version 6) addresses to DHCPv6 clients. Based on snooped DHCPv6 messages, snooping agent 50(2) allocated entries in binding table 70(2). The information in binding table 70(2) can then be used by access control module 602(2) to filter IPv6 network traffic.

Thus, as shown in FIG. 6A, a network device such as switch 20 can perform traffic filtering for several different network protocols by snooping each of several different protocols that are used to assign network addresses to clients. It is noted that the different snooping agents, binding tables, and access control modules can be physically separate in some embodiments, and integrated in other embodiments. Also, the functionality of more than two sets of snooping agents, binding tables, and access control modules can be implemented.

Figure 7:
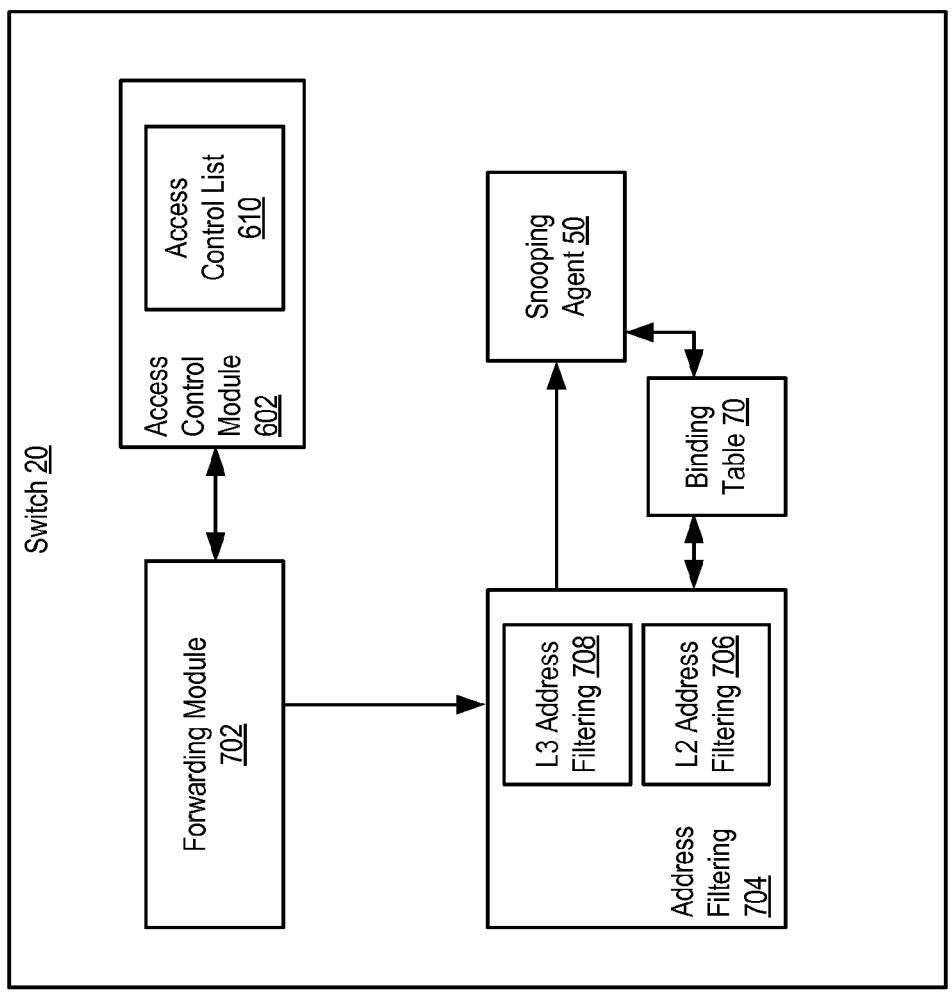
FIG. 7 shows another example of a switch that is configured to perform network traffic filtering, according to one embodiment of the present invention.

FIG. 7 illustrates how the functionality used to implement IP traffic filtering can be implemented in some embodiments. In the example of FIG. 7, switch 20 includes a forwarding module 702 that performs forwarding lookups (e.g., based on Ethernet headers) for messages received by switch 20. Switch 20 also includes access control module 602, an address filtering module 704, and snooping agent 50. In one embodiment, forwarding module 702 and access control module 602 are implemented in hardware, while address filtering module 704 and snooping agent 50 are implemented in software. The modules can be implemented differently (e.g., all in software) in other embodiments.

A message received by switch 20 is initially processed based on information in forwarding module 702 (e.g., by providing information associated with and/or included in the message to forwarding module 702). Forwarding module 702 stores addresses (e.g., MAC addresses) that are included in messages handled by switch 20. In one embodiment, forwarding module 702 stores information associating MAC addresses with interface IDs. For example, each time a message is received by switch 20, the source address of the message and the interface ID of the interface via which the message entered switch 20 can be stored in a lookup table included in forwarding module 702. If a subsequently received message specifies the stored address as a destination address, the subsequently received message can be forwarded to the interface identified by the stored interface ID. Forwarding module 702 can be used to perform L2 (e.g., Ethernet) forwarding within switch 20.

If the source address of an incoming message is not found by forwarding module 702 (i.e., if there is no matching entry for that message, based on the message's source address, in the lookup table), information included in and/or associated with the incoming message is passed to address filtering module 704 for additional processing. If the source address of the incoming message hits in the lookup table (i.e., if a matching entry for the source address of that message is found), information included in and/or associated with the message can be provided to access control module 602. Access control module 602 can provide information to forwarding module 702 indicating whether a given message should be dropped or provided to snooping agent 50 for additional handling.

As described above, access control module 602 stores information encoding various access control rules, which can be calculated based on information in a binding table. One of the access control rules can specify that all protocol messages (e.g., all DHCP messages) should be handled in software (e.g., to perform protocol message snooping). Thus, as shown in FIG. 7, protocol messages are detected by access control module 602. When a protocol message is detected, information associated with and/or included in the protocol messages is then provided to snooping agent 50 (e.g., in response to an access control rule). Additional access control rules in access control module 602 can specify which source addresses are allowed to be received via various interfaces in switch 20. Access control module 602 can operate to drop messages having source addresses that are not explicitly allowed by an access control rule associated with the interface that received those messages.

Snooping agent 50 can drop protocol messages (e.g., based on rate limiting constraints or based on information in a binding table created by snooping agent 50), create or modify binding table entries based on protocol messages, and/or allow protocol messages to be output. Snooping agent 50 can operate as described above with respect to FIG. 2A.

Address filtering module 704 performs processing for messages that cannot be processed in hardware (e.g., due to the source address of a message missing in a lookup table). In the illustrated example, address filtering module 704 performs IP source address and layer 2 (L2) source address filtering. The L2 source address filtering can, for example, involving filtering messages based on MAC source addresses included in Ethernet headers. In this example, L2 source address filtering is performed by an L2 address filtering module 706, and L3 source address filtering is performed by an L3 address filtering module 708. It is noted that while L2 address filtering module 706 and L3 address filtering module 708 are implemented separately and operate independently of each other in this example, the functionality of these modules can be integrated and/or inter-dependent in other embodiments.

L3 address filtering module 708 detects protocol messages (e.g., DHCP messages) and passes information associated with and/or included in detected protocol messages to snooping agent 50. L3 address filtering module 708 then filters non-protocol messages based on information in binding table 70. For example, if a binding table entry associates a single IP address IP1 with interface ID I12, L3 address filtering module 708 will not drop a message having a source address of IP1 and received via I12. However, L3 address filtering module 708 will cause a message having a source address of IP2 that was received via I12 to be dropped. Thus, L3 address filtering module 708 drops any non-protocol messages that are not consistent with information in binding table 70.

L2 address filtering module 706 can also filter messages based on information in binding table 70. Alternatively, L2 address filtering module 706 can maintain its own binding table, based on information obtained by snooping agent 50.

Some embodiments can perform at least some of the traffic filtering in software. For example, address filtering module 704 can be implemented in software and used to perform processing for messages having source addresses that miss in the lookup table of forwarding module 702. In such embodiments, performing processing for messages in software may consume more time and/or switch resources than would be needed to performing corresponding processing for those messages in hardware. This presents a security weakness that a malicious user can exploit by sending a large number of messages, constructed in a way that will require software handling, to the switch. If the switch attempts to handle all of the malicious user's messages, the performance of the switch may be negatively affected. In order to prevent such attacks from having a negative impact, address filtering module 704 can implement rate limiting. Rate limiting operates such that if a certain number of "bad" messages (i.e., messages that are filtered from the message stream) are detected within a given time period, the module will begin dropping messages provided to the module, without first evaluating those messages. Rate limiting can be performed on a per-interface basis (e.g., if rate limiting is triggered, all messages received via a particular interface will be dropped), a per-source basis (e.g., if rate limiting is triggered, all messages received from a particular source will be dropped), and/or any other appropriate basis.

Figure 8:
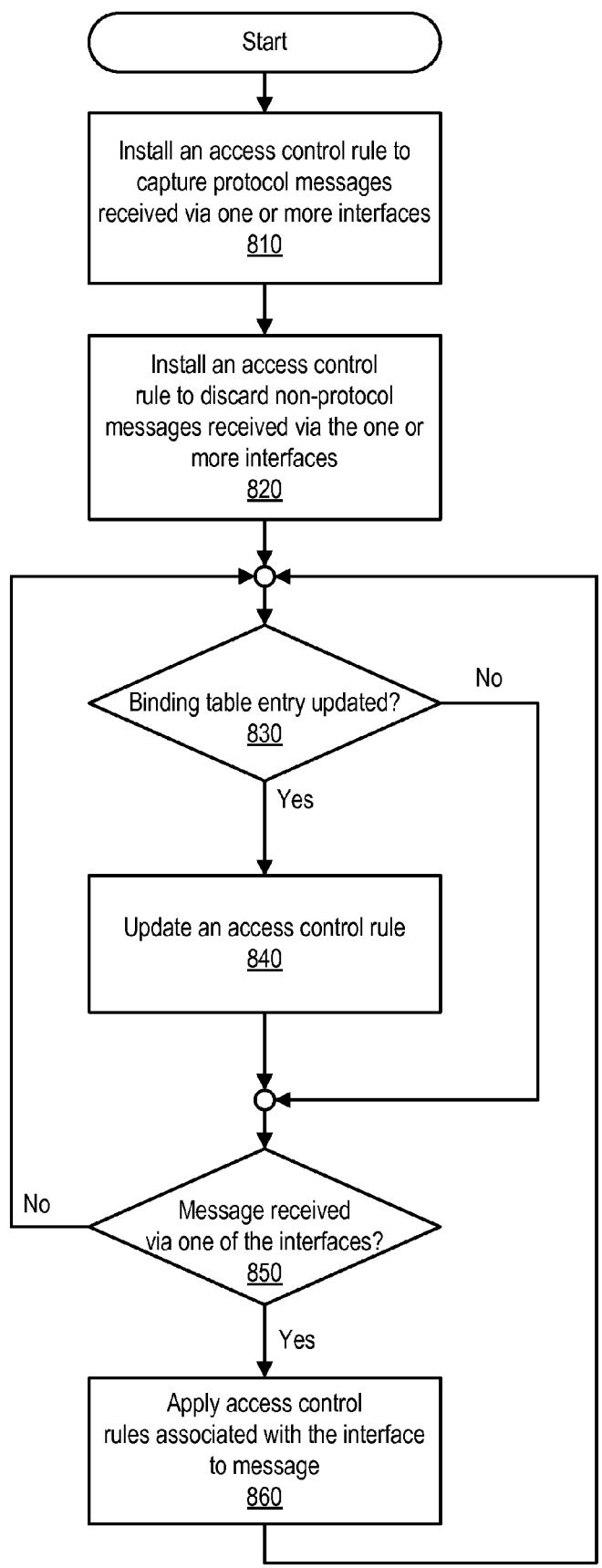
FIG. 8 is a flowchart of one embodiment of a method of performing network traffic filtering.

FIG. 8 illustrates one embodiment of a method of performing traffic filtering based on information obtained via protocol snooping. At 810, an access control rule is installed (e.g., by allocating an entry in an access control list to store information encoding the access control rule). The access control rule specifies that protocol messages (e.g., all DHCP messages) received via one or more interfaces should be captured. When such messages are captured, information associated with and/or included in those messages is provided to a snooping agent (e.g., such as snooping agent 50 described above) that verifies the protocol messages and/or stores information in the protocol messages in a binding table. The binding table identifies network addresses that have been assigned to clients that are coupled to particular interfaces. In some embodiments, the binding table identifies L2 and L3 addresses of the clients and other information, as described above.

The access control rule installed at 810 can specify one interface, a subset of all of the interfaces in a given network device, or all of the interfaces in the network device. For example, the access control rule can specify all of the interfaces in the network device for which protocol snooping and/or traffic filtering has been enabled. Thus, a single access control rule can be used to capture protocol messages received via more than one interface.

At 820, another access control rule is installed. This access control rule indicates that non-protocol messages received via one or more interfaces (e.g., interfaces for which traffic filtering has been enabled) should be dropped. Accordingly, protocol messages will be captured (due to the rule installed at 810) and non-protocol messages will be dropped. It is noted that installing the access control rule at 820 can involve installing a respective access control rule for each of the one or more interfaces for which traffic filtering is enabled.

Binding table entries are updated (e.g., allocated, modified and/or deleted) in response to captured protocol messages. Each time a binding table entry is updated, as detected at 830, an access control rule corresponding to the binding table entry is updated (e.g., by allocating, modifying, and/or deleting an entry in an access control list), as shown at 840. For example, if a new binding table entry is allocated to store information indicating that IP address IP1 has been assigned to a client coupled to interface I1, a corresponding entry in an access control list can be allocated to store information encoding a rule stating that messages having source address IP1 that are received via interface I1 should be allowed. Alternatively, an existing entry in the access control list that corresponds to interface I1 can be modified. For example, an entry that stores the access control rule installed at 820 for interface I1 can be modified, such that the modified rule indicates that all messages, other than the messages having source address IP1, that are received via interface I1 should be dropped. It is noted that the corresponding access control rule can also specify other information (e.g., VLAN, MAC address, and the like) included in the binding table entry. For example, the corresponding access control rule could state that all messages received via a particular interface, except messages having the IP source address and MAC source address indicated in the binding table entry associated with that interface, should be dropped.

If a message is received via one of the interfaces, as detected at 850, the access control rules associated with that interface (e.g., as detected using a content addressable memory to compare information in the message header or headers to information used to select appropriate access control rules) are applied to the message, as shown at 860. Thus, if the access control rules indicate that the message should only be allowed if the source IP address of the message is IP1 and the source MAC address of the message is MAC 3, the message is dropped or not dropped based on the source IP and MAC addresses of the message.

Figure 9:
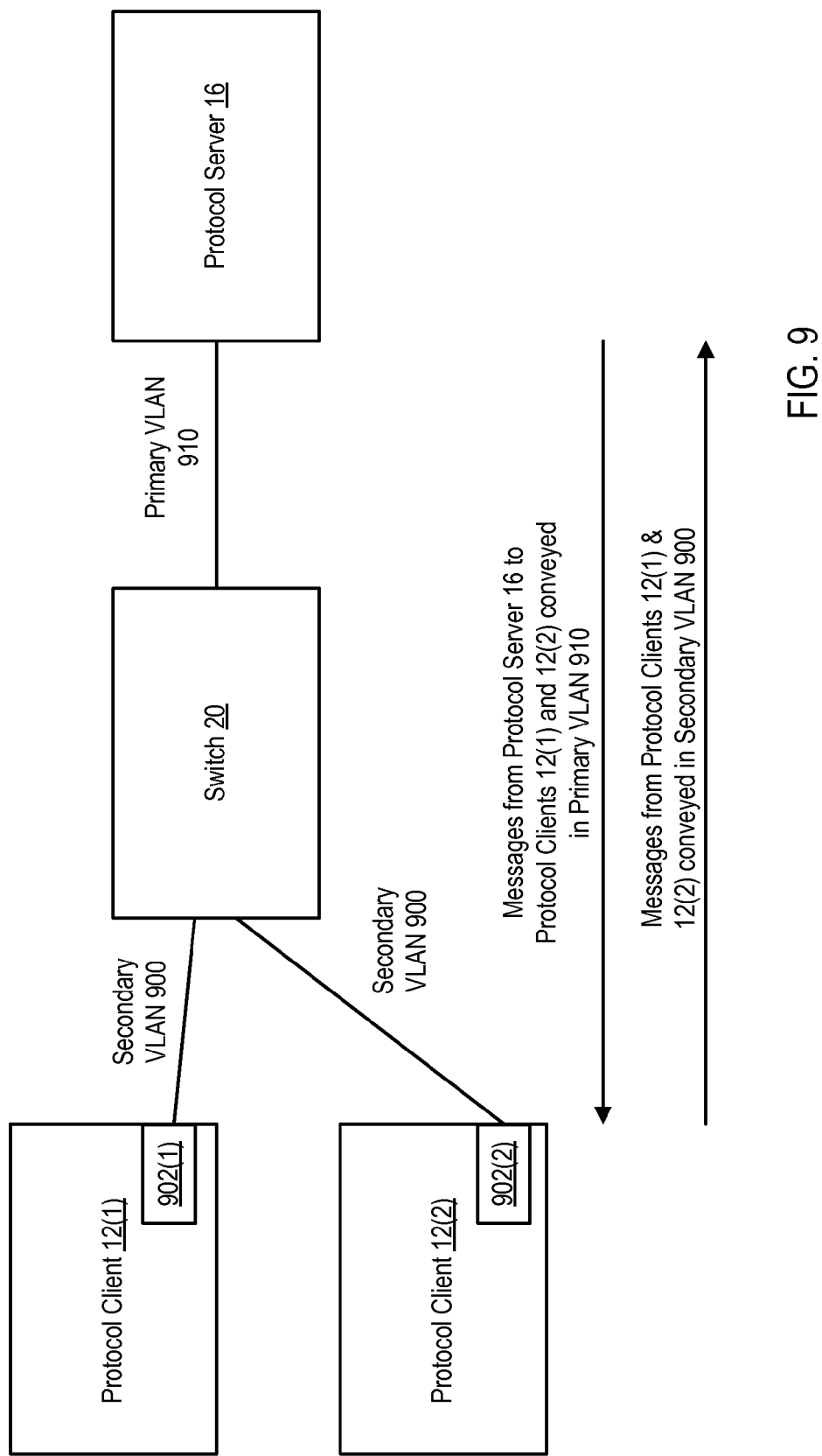
FIG. 9 illustrates a switch that supports private VLANs and is configured to perform network traffic filtering, according to one embodiment of the present invention.

FIG. 9 illustrates how a private VLAN can be implemented in a network. As shown, two protocol clients (e.g., two DHCP clients) 12(1) and 12(2) are coupled to a protocol server 16 by (at least) one network device, switch 20. Switch 20 performs IP message filtering as described above (e.g., using access control list 610 of FIG. 6). In this example, each protocol client 12(1) and 12(2) is coupled to switch 20 by a different isolated port within secondary VLAN 900. In particular, protocol client 12(1) is coupled to switch 20 by isolated port 902(1) of secondary VLAN 900, while protocol client 12(2) is coupled to switch 20 by isolated port 902(2) of secondary VLAN 900. Secondary VLAN 900 is implemented as a private VLAN within a primary VLAN 910, which conveys traffic between protocol clients 12(1) and 12(2) and protocol server 16. Secondary VLAN 900 is private in that clients 12(1) and 12(2) cannot communicate directly with each other via secondary VLAN 900. Messages generated by protocol clients 12(1) and 12(2) are conveyed in secondary VLAN 900. Messages generated by protocol server 16 are conveyed in primary VLAN 910.

Private VLANs are often used to provide isolation between different interfaces of a network device such as switch 20. Private VLANs are defined by configuring interfaces as promiscuous, isolated, and/or community interfaces and mapping each interface to a primary or secondary VLAN (isolated interfaces are illustrated in FIG. 9). Isolated and community interfaces are part of secondary VLANs, while promiscuous interfaces are part of primary VLANs. In this example, the interface coupled to protocol server 16 is a promiscuous interface. The interfaces 902(1) and 902(2) coupled to the protocol clients 12(1) and 12(2) are isolated interfaces.

Messages received via a promiscuous interface in a primary VLAN can be conveyed via any other isolated, community, or promiscuous interfaces in the same primary VLAN. Thus, in FIG. 9, messages received by switch 20 from protocol server 16 can be conveyed to any of the isolated interfaces in secondary VLAN 900 (depending on other criteria associated with such messages, which may be used to select a particular interface within those secondary VLANs).

In contrast, messages that are received by switch 20 from an isolated or community interface in a secondary VLAN can only be sent via promiscuous interfaces in the same primary VLAN and community interfaces in the same secondary VLAN. Isolated interfaces that are part of the same secondary VLAN cannot exchange messages (i.e., a messages received via an isolated interface cannot be sent via another isolated interface, even if the other isolated interface is in the same secondary VLAN as the receiving interface). Community interfaces can only exchange messages with promiscuous interfaces in the same primary VLAN and other isolated and community interfaces in the same secondary VLAN.

As described above, a binding table entry (e.g., in binding table 70 of FIG. 6) is typically allocated in response to a message (e.g., a DHCP ACK) being conveyed from a protocol server to a protocol client. As shown in FIG. 9, such messages are conveyed in the primary VLAN 910.

The information in the binding table can then be used to filter messages being conveyed from the protocol clients 12(1) and/or 12(2), which are conveyed in secondary VLAN 900. Thus, by snooping messages conveyed in one VLAN (e.g., primary VLAN 910), information is obtained for use in filtering messages being conveyed in another VLAN (e.g., secondary VLAN 900). Looking back at FIG. 6, processing module 604 can calculate access control rules in response to binding table entries that specify the primary VLAN and an interface ID. Processing module 604 calculates and encodes the access control rules such that the rules specify and/or are applied to a secondary VLAN instead of the primary VLAN. For example, a binding table entry associating IP address IP1 with the interface coupled to protocol client 12(2) can be allocated in response to protocol server 16 assigning IP address IP1 to protocol client 12(2) by sending a DHCP ACK message in primary VLAN 910. Processing module 604 can calculate an access control rule indicating that messages received via the interface coupled to protocol client 12(2) in secondary VLAN 900 should be dropped unless the source IP address of those messages is IP1.

Figure 10:
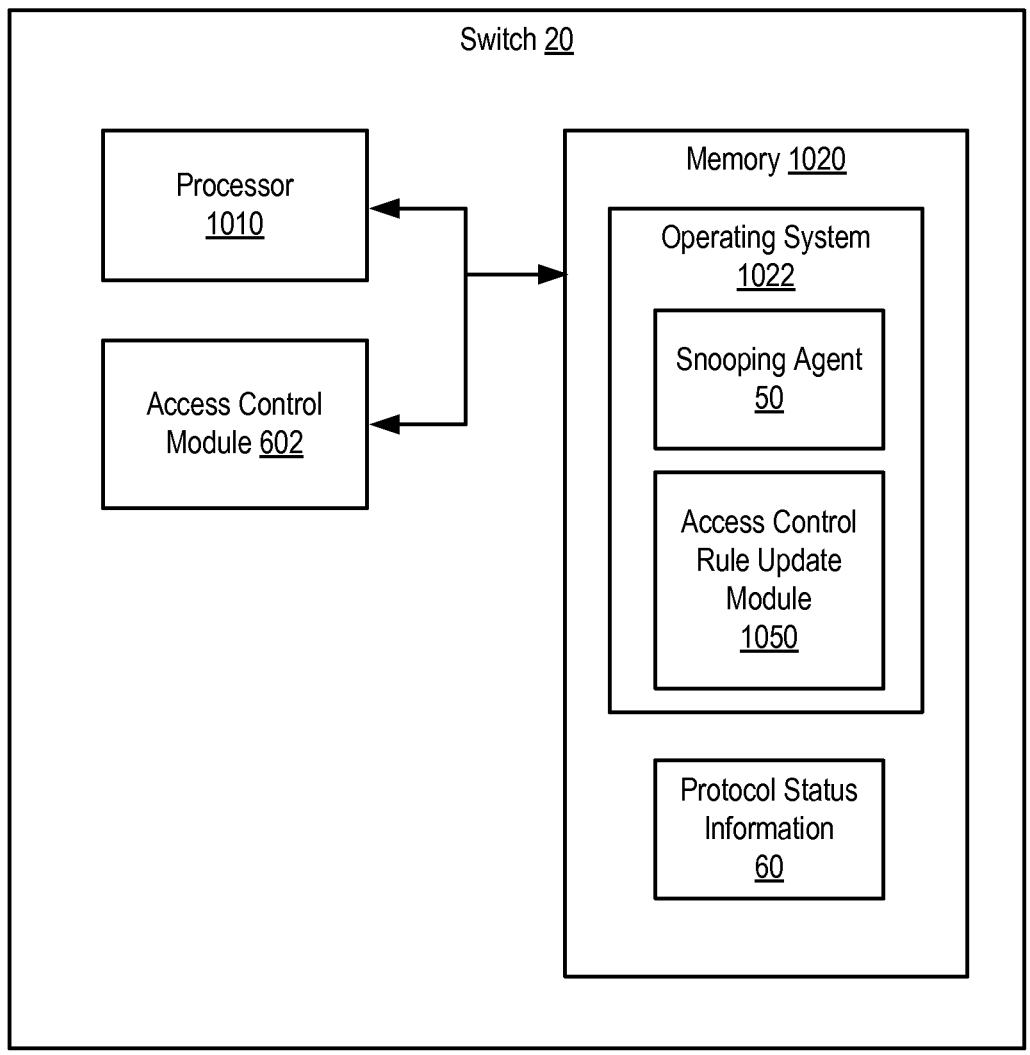
FIG. 10 is a block diagram of a switch illustrating how a snooping agent and access control rule update module can be implemented in software executing on the switch, according to one embodiment.

FIG. 10 is a block diagram of switch 20 illustrating how a snooping agent 50 and access control rule update module 1050 (which updates access control rules in response to information obtained by snooping agent 50, using the techniques described above) and can be implemented in software executing on a network device such as switch 20. It is noted that other components (e.g., access control module 602, as shown in FIG. 6) can also be implemented in software executing on switch 20 in some embodiments. As illustrated, switch 20 includes one or more processors 1010 (e.g., implemented using one or more microprocessors, PLDs (Programmable Logic Devices), ASICs (Application Specific Integrated Circuits), or the like) configured to execute program instructions stored in memory 1020. Memory 1020 can include various types of RAM, ROM, Flash memory, MEMS memory, and the like. In the illustrated embodiment, access control module 602 is implemented in hardware (e.g., using a CAM and/or ACL). Processor 1010, access control module 602, and memory 1020 are coupled to send and receive data and control signals by a bus or other interconnect.

Memory 1020 stores program instructions executable by processor 1010 to implement an operating system 1022 configured to control basic functionality of switch 20. Operating system 1022 can include snooping agent 50 and access control rule update module 1050 (alternatively, snooping agent 50 and access control rule update module 1050 can be implemented as programs that interact with, but is not part of, operating system 1022). Memory 1020 may also be used to store protocol status information 60 used and maintained by snooping agent 50.

The program instructions and data implementing snooping agent 50 and access control rule update module 1050 can be stored upon various computer readable media such as memory 1020. In some embodiments, snooping agent 50 and access control rule update module 1050 software is stored on a computer readable medium such as a CD (Compact Disc), DVD (Digital Versatile Disc), hard disk, optical disk, tape device, floppy disk, and the like). In order be executed by processor 1010, the instructions and data implementing snooping agent 50 and access control rule update module 1050 are loaded into memory 1020 from the other computer readable medium. The instructions and/or data implementing can also be transferred to switch 20 via a network such as the Internet or upon a carrier medium. In some embodiments, a computer readable medium is a carrier medium such as a network and/or a wireless link upon which signals such as electrical, electromagnetic, or digital signals, on which the data and instructions implementing snooping agent 50 and access control rule update module 1050 are encoded, are conveyed.

Although the present invention has been described with respect to specific embodiments thereof, various changes and modifications may be suggested to one skilled in the art. It is intended such changes and modifications fall within the scope of the appended claims.

What is claimed is:

1. A method comprising:
maintaining protocol status information for a network protocol, wherein
the protocol status information comprises protocol information for the network protocol,
the protocol status information is generated by a protocol server,
the protocol status information is used to determine an access control rule, and
the access control rule is applied to a message;
performing a security action associated with the access control rule to determine whether the message sent from the protocol server to a protocol client comprises a protocol message, wherein
the security action comprises verifying that information in the message matches the protocol status information;
based on a determination that the message comprises the protocol message, unicasting the message to the protocol client instead of broadcasting, multicasting, or flooding the message to multiple recipients; and
updating a binding table entry comprising protocol status information associated with the protocol client, the protocol status information comprising information identifying an Internet Protocol (IP) address of the client, a Media Access Control address (MAC) of the client, and an interface coupled to the client.

2. The method of claim 1, wherein
the message comprises message information comprising a source address, a destination address, and a virtual local area network (VLAN),
the message information is used to select the access control rule,
the access control rule is calculated using protocol status information,
the protocol status information is maintained for a network protocol,
the protocol status information is obtained in response to one or more protocol messages sent between at least one client and the protocol server,
the protocol status information is generated by the protocol server,
the one or more protocol messages are conveyed according to a protocol used to assign network addresses to clients, and
the access control rule is stored in an access control list.

3. The method of claim 2 wherein,
maintaining the protocol status information for the network protocol comprises:
network traffic information indicative of how many messages are conveyed from the protocol client to a network, and
updating both the protocol status information and the network traffic information in response to intercepting the protocol message being conveyed between the client and the protocol server.

4. The method of claim 3, comprising
intercepting the protocol message being communicated via the network, and
upon updating both the protocol status information and the network traffic information, performing the security action in response to the protocol message dependent on the network traffic information, and a type of the protocol message.

5. The method of claim 2, wherein
the maintaining of the protocol status information is performed by a network switch,
the protocol status information indicates which one or a plurality of interfaces comprised in the network switch is coupled to convey messages to and from a particular client,
at least some of the plurality of interfaces are logical interfaces, and
the plurality of interfaces are implemented in a hierarchy.

6. The method of claim 1, comprising
performing the security action in response to intercepting a subsequent protocol message dependent on the protocol status information.

7. The method of claim 6, wherein
if the subsequent protocol message is a protocol reply from the protocol server to the protocol client, performing the security action comprises
unicasting the protocol reply to the protocol client.

8. The method of claim 1, wherein
the unicasting is performed by a snooping agent, and
unicasting the protocol message to the protocol client instead of forwarding the message normally, inhibits an ability of a device other than the protocol client to snoop information being provided to the protocol client by the protocol server.

9. A system comprising:
one or more processors; and
a memory coupled to the one or more processors, wherein
the memory stores program instructions executable by the one or more processors to:
maintain protocol status information for a network protocol, wherein
the protocol status information comprises protocol information for the network protocol,
the protocol status information is generated by a protocol server
the protocol status information is used to determine an access control rule, and
the access control rule is applied to a message;
perform a security action associated with the access control rule to determine whether a message sent from the protocol server to a protocol client comprises a protocol message, wherein
the security action comprises verifying that information in the message matches the protocol status information;
based on a determination that the message comprises the protocol message, unicasting the message to the protocol client instead of broadcasting, multicasting, or flooding the message to multiple recipients; and
updating a binding table entry comprising protocol status information associated with the protocol client, the protocol status information comprising information identifying an Internet Protocol (IP) address of the client, a Media Access Control address (MAC) of the client, and an interface coupled to the client.

10. The system of claim 9, wherein
the message comprises message information comprising a source address, a destination address, and a virtual local area network (VLAN),
the message information is used to select the access control rule, the access control rule is calculated using protocol status information, the protocol status information is maintained for a network protocol, the protocol status information is obtained in response to one or more protocol messages sent between at least one client and the protocol server, the protocol status information is generated by the protocol server, the one or more protocol messages are conveyed according to a protocol used to assign network addresses to clients, and the access control rule is stored in an access control list.

11. The system of claim 10 wherein,
maintaining the protocol status information for the network protocol comprises:
  network traffic information indicative of how many messages are conveyed from the protocol client to a network, and
  updating both the protocol status information and the network traffic information in response to intercepting the protocol message being conveyed between the client and the protocol server.

12. The system of claim 11, comprising
intercepting the protocol message being communicated via the network, and
upon updating both the protocol status information and the network traffic information, performing the security action in response to the protocol message dependent on the network traffic information, and a type of the protocol message.

13. The system of claim 10, wherein
the maintaining of the protocol status information is performed by a network switch,
the protocol status information indicates which one or a plurality of interfaces comprised in the network switch is coupled to convey messages to and from a particular client,
at least some of the plurality of interfaces are logical interfaces, and
the plurality of interfaces are implemented in a hierarchy.

14. The system of claim 9, comprising
performing the security action in response to intercepting a subsequent protocol message dependent on the protocol status information; and
if the subsequent protocol message is a protocol reply from the protocol server to the protocol client, performing the security action comprises
unicasting the protocol reply to the protocol client.

15. The system of claim 9, wherein
the unicasting is performed by a snooping agent, and
unicasting the protocol message to the protocol client instead of forwarding the message normally, inhibits an ability of a device other than the protocol client to snoop information being provided to the protocol client by the protocol server.

16. A non-transitory computer-readable storage medium storing program instructions executable to:
maintain protocol status information for a network protocol, wherein
  the protocol status information comprises protocol information for the network protocol,
  the protocol status information is generated by a protocol server,
  the protocol status information is used to determine an access control rule, and
  the access control rule is applied to a message;
perform a security action associated with the access control rule to determine whether a message sent from the protocol server to a protocol client comprises a protocol message, wherein
  the security action comprises verifying that information in the message matches the protocol status information;
based on a determination that the message comprises the protocol message, unicasting the message to the protocol client instead of broadcasting, multicasting, or flooding the message to multiple recipients; and
updating a binding table entry comprising protocol status information corresponding to the protocol client, the protocol status information comprising information identifying an Internet Protocol (IP) address of the client, a Media Access Control address (MAC) of the client, and an interface coupled to the client.

17. The non-transitory computer readable storage medium of claim 16, wherein
the message comprises message information comprising a source address, a destination address, and a virtual local area network (VLAN),
the message information is used to select the access control rule,
the access control rule is calculated using protocol status information,
the protocol status information is maintained for a network protocol,
the protocol status information is obtained in response to one or more protocol messages sent between at least one client and the protocol server,
the protocol status information is generated by the protocol server,
the one or more protocol messages are conveyed according to a protocol used to assign network addresses to clients, and
the access control rule is stored in an access control list.

18. The non-transitory computer readable storage medium of claim 17, wherein
maintaining the protocol status information for the network protocol comprises:
  network traffic information indicative of how many messages are conveyed from the protocol client to a network, and
  updating both the protocol status information and the network traffic information in response to intercepting the protocol message being conveyed between the client and the protocol server;
the maintaining of the protocol status information is performed by a network switch;
the protocol status information indicates which one or a plurality of interfaces comprised in the network switch is coupled to convey messages to and from a particular client;
at least some of the plurality of interfaces are logical interfaces; and
the plurality of interfaces are implemented in a hierarchy.

19. The non-transitory computer readable storage medium of claim 18, comprising
intercepting the protocol message being communicated via the network, and
upon updating both the protocol status information and the network traffic information, performing the security action in response to the protocol message dependent on the network traffic information, and a type of the protocol message.

20. The non-transitory computer readable storage medium of claim 16, comprising
performing the security action in response to intercepting a subsequent protocol message dependent on the protocol status information; and
if the subsequent protocol message is a protocol reply from the protocol server to the protocol client, performing the security action comprises
unicasting the protocol reply to the protocol client.

21. The non-transitory computer readable storage medium of claim 16, wherein
the unicasting is performed by a snooping agent, and
unicasting the protocol message to the protocol client instead of forwarding the message normally, inhibits an ability of a device other than the protocol client to snoop information being provided to the protocol client by the protocol server.

22. The method of claim 1, wherein
the protocol status information is used to calculate an access control rule,
the access control rule is applied to the message,
the access control rule indicates performance of the security action, and
as a result of the unicasting, only the protocol client receives the protocol message.

23. The system of claim 9, wherein
the protocol status information is used to calculate an access control rule,
the access control rule is applied to the message,
the access control rule indicates performance of the security action, and
as a result of the unicasting, only the protocol client receives the protocol message.

24. The non-transitory computer readable storage medium of claim 16, wherein
the protocol status information is used to calculate an access control rule,
the access control rule is applied to the message,
the access control rule indicates performance of the security action, and
as a result of the unicasting, only the protocol client receives the protocol message.

\* \* \* \* \*